(12) United States Patent
Lee et al.

(10) Patent No.: US 11,612,005 B2
(45) Date of Patent: Mar. 21, 2023

(54) UNIT SELECTION FOR A NODE

(71) Applicant: QUALCOMM Incorporated, San Diego, CA (US)

(72) Inventors: Soo Bum Lee, San Diego, CA (US); Gavin Bernard Horn, La Jolla, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/082,532

(22) Filed: Oct. 28, 2020

(65) Prior Publication Data

US 2022/0132599 A1    Apr. 28, 2022

(51) Int. Cl.
| | |
|---|---|
| *H04W 76/10* | (2018.01) |
| *H04W 36/06* | (2009.01) |
| *H04W 48/10* | (2009.01) |
| *H04W 74/08* | (2009.01) |
| *H04W 84/04* | (2009.01) |
| *H04W 88/08* | (2009.01) |

(52) U.S. Cl.
CPC ........... *H04W 76/10* (2018.02); *H04W 36/06* (2013.01); *H04W 48/10* (2013.01); *H04W 74/0833* (2013.01); *H04W 84/047* (2013.01); *H04W 88/085* (2013.01)

(58) Field of Classification Search
CPC ..... H04W 76/10; H04W 36/06; H04W 48/10; H04W 74/0833; H04W 84/047; H04W 88/085

USPC ........ 370/310, 329, 328, 338, 341, 345, 350
See application file for complete search history.

(56) References Cited

U.S. PATENT DOCUMENTS

| | | | | |
|---|---|---|---|---|
| 2018/0115363 A1* | 4/2018 | Abedini | ............... | H04B 7/2684 |
| 2020/0053792 A1* | 2/2020 | Ryu | .................. | H04W 74/0833 |

FOREIGN PATENT DOCUMENTS

| | | |
|---|---|---|
| EP | 3588851 A1 | 1/2020 |
| EP | 3706468 A1 | 9/2020 |
| WO | WO-2020092169 A1 | 5/2020 |
| WO | WO-2020154918 A1 | 8/2020 |

OTHER PUBLICATIONS

International Search Report and Written Opinion—PCT/US2021/052689—ISA/EPO—dated Feb. 1, 2022.

* cited by examiner

*Primary Examiner* — Nghi H Ly
(74) *Attorney, Agent, or Firm* — Holland & Hart LLP

(57) ABSTRACT

Methods, systems, and devices for wireless communications are described. A first node of a wireless communications network may determine a service type of the first node. The first node may transmit, to a second node during a random access procedure, an indication of the service type of the first node. The first node may then establish a connection with a unit of the second node that is for serving nodes of the wireless network associated with the service type. The connection may be established based on transmitting the indication of the service type.

13 Claims, 16 Drawing Sheets

UNIT SELECTION FOR A NODE

FIELD OF TECHNOLOGY

The following relates to wireless communications, including unit selection for a node.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support unit selection for a node. Generally, the described techniques provide for a first node, such as a donor node, to assist a second node, such as a relay node, with connecting to a unit, such as a central unit, for example, of the node that may be shared with a third node, such as a second donor node. The second node, which may be a relay node, or another device may communicate with the first node a service type of the second node so that the first node can select for connection the unit, such as the shared central unit, which may be for serving nodes of a first type (e.g., mobile nodes such as mobile relay nodes).

A method of wireless communication at a first node of a wireless network is described. The method may include determining a service type of the first node, the service type indicating that the first node is a mobile node, transmitting, to a second node during a random access procedure, an indication of the service type of the first node, and establishing a connection with a unit of the second node for serving nodes of the wireless network associated with the service type based on transmitting the indication of the service type during the random access procedure.

An apparatus for wireless communication at a first node of a wireless network is described. The apparatus may include a processor, a memory coupled with the processor, and instructions stored in the memory. The instructions may be executable by the processor to cause the apparatus to determine a service type of the first node, the service type indicating that the first node is a mobile node, transmit, to a second node during a random access procedure, an indication of the service type of the first node, and establish a connection with a unit of the second node for serving nodes of the wireless network associated with the service type based on transmitting the indication of the service type during the random access procedure.

Another apparatus for wireless communication at a first node of a wireless network is described. The apparatus may include means for determining a service type of the first node, the service type indicating that the first node is a mobile node, transmitting, to a second node during a random access procedure, an indication of the service type of the first node, and establishing a connection with a unit of the second node for serving nodes of the wireless network associated with the service type based on transmitting the indication of the service type during the random access procedure.

A non-transitory computer-readable medium storing code for wireless communication at a first node of a wireless network is described. The code may include instructions executable by a processor to determine a service type of the first node, the service type indicating that the first node is a mobile node, transmit, to a second node during a random access procedure, an indication of the service type of the first node, and establish a connection with a unit of the second node for serving nodes of the wireless network associated with the service type based on transmitting the indication of the service type during the random access procedure.

In some examples of the method, apparatuses, and non-transitory computer-readable medium described herein, transmitting the indication of the service type may include operations, features, means, or instructions for transmitting the indication of the service type in a request to establish the connection with the second node.

In some examples of the method, apparatuses, and non-transitory computer-readable medium described herein, the request includes a Message 3 of the random access procedure or a Message A of the random access procedure.

In some examples of the method, apparatuses, and non-transitory computer-readable medium described herein, transmitting the request may include operations, features, means, or instructions for transmitting a second portion of the identifier in a Message 5 of the random access procedure.

In some examples of the method, apparatuses, and non-transitory computer-readable medium described herein, transmitting the indication of the service type may include operations, features, means, or instructions for transmitting the indication of the service type in a confirmation message of the random access procedure.

In some examples of the method, apparatuses, and non-transitory computer-readable medium described herein, the confirmation message includes a Message 5 of the random access procedure.

In some examples of the method, apparatuses, and non-transitory computer-readable medium described herein, transmitting the indication of the service type may include operations, features, means, or instructions for transmitting a random access preamble over a set of random access channel resources dedicated to nodes associated with the service type.

Some examples of the method, apparatuses, and non-transitory computer-readable medium described herein may further include operations, features, means, or instructions for receiving from the second node a system information block indicating the set of random access channel resources may be dedicated to nodes associated with the service type.

In some examples of the method, apparatuses, and non-transitory computer-readable medium described herein, the first node includes a relay node, the second node includes a donor node, and the unit includes a central unit of the donor node that may be shared between a set of nodes including the second node.

In some examples of the method, apparatuses, and non-transitory computer-readable medium described herein, the service type indicates a mobile node the connection may be a connection. In some examples of the method, apparatuses, and non-transitory computer-readable medium described herein, the first node is a user equipment (UE).

A method of wireless communication at first unit of a first node in a wireless network is described. The method may include receiving an indication of a service type of a second node, the service type indicating that the second node is a mobile node, determining, based on the service type of the second node, a second unit of the first node to establish a connection with the second node, the second unit for serving nodes associated with the service type and being one of a set of units of the first node, and transmitting a request to establish the connection to the second unit for serving nodes associated with the service type based on the determination.

An apparatus for wireless communication at first unit of a first node in a wireless network is described. The apparatus may include a processor, a memory coupled with the processor, and instructions stored in the memory. The instructions may be executable by the processor to cause the apparatus to receive an indication of a service type of a second node, the service type indicating that the second node is a mobile node, determine, based on the service type of the second node, a second unit of the first node to establish a connection with the second node, the second unit for serving nodes associated with the service type and being one of a set of units of the first node, and transmit a request to establish the connection to the second unit for serving nodes associated with the service type based on the determination.

Another apparatus for wireless communication at first unit of a first node in a wireless network is described. The apparatus may include means for receiving an indication of a service type of a second node, the service type indicating that the second node is a mobile node, determining, based on the service type of the second node, a second unit of the first node to establish a connection with the second node, the second unit for serving nodes associated with the service type and being one of a set of units of the first node, and transmitting a request to establish the connection to the second unit for serving nodes associated with the service type based on the determination.

A non-transitory computer-readable medium storing code for wireless communication at first unit of a first node in a wireless network is described. The code may include instructions executable by a processor to receive an indication of a service type of a second node, the service type indicating that the second node is a mobile node, determine, based on the service type of the second node, a second unit of the first node to establish a connection with the second node, the second unit for serving nodes associated with the service type and being one of a set of units of the first node, and transmit a request to establish the connection to the second unit for serving nodes associated with the service type based on the determination.

In some examples of the method, apparatuses, and non-transitory computer-readable medium described herein, receiving the indication of the service type may include operations, features, means, or instructions for receiving the indication of the service type in a request from the second node to establish the connection with the first node.

In some examples of the method, apparatuses, and non-transitory computer-readable medium described herein, the request from the second node includes a Message 3 of a random access procedure or a Message A of a random access procedure.

In some examples of the method, apparatuses, and non-transitory computer-readable medium described herein, the request from the second node may include operations, features, means, or instructions for receiving a second portion of the identifier in Message 5 of a random access procedure.

In some examples of the method, apparatuses, and non-transitory computer-readable medium described herein, transmitting the request may include operations, features, means, or instructions for transmitting the request to the second unit for serving nodes associated with the service type, the request including an indication of the service type of the second node.

Some examples of the method, apparatuses, and non-transitory computer-readable medium described herein may further include operations, features, means, or instructions for transmitting an indication of the service type of the second node to a core network based on the second node establishing the connection with the second unit for serving nodes associated with the service type, and receiving, from the core network, confirmation that the second node may have the indicated service type.

In some examples of the method, apparatuses, and non-transitory computer-readable medium described herein, receiving the indication of the service type may include operations, features, means, or instructions for receiving the indication of the service type in a confirmation message from the second node, the confirmation message part of a random access procedure to establish the connection with the first node.

In some examples of the method, apparatuses, and non-transitory computer-readable medium described herein, the confirmation message includes a Message 5 of the random access procedure.

In some examples of the method, apparatuses, and non-transitory computer-readable medium described herein, the connection with the second unit may include operations, features, means, or instructions for receiving a message from the second node confirming that a first connection may have been established with a third unit of the first node that may be for serving nodes associated with a second service type, where the message includes the indication of the service type of the second node, and transmitting, to the third unit for serving nodes associated with the second service type based on the service type of the second node, an instruction to release the first connection with the second node, where the second connection may be established based on the instruction to release the first connection.

Some examples of the method, apparatuses, and non-transitory computer-readable medium described herein may further include operations, features, means, or instructions for transmitting, to the second unit based on the service type of the second node, the request to establish the second connection.

Some examples of the method, apparatuses, and non-transitory computer-readable medium described herein may further include operations, features, means, or instructions for receiving a request from the second node to establish radio resource control connectivity with the first node, and selecting, based on the request, the third unit to establish the first connection with the second node.

In some examples of the method, apparatuses, and non-transitory computer-readable medium described herein, the indication of the service type may be received from a core network during a registration procedure with the second node.

In some examples of the method, apparatuses, and non-transitory computer-readable medium described herein, the connection with the second unit may include operations, features, means, or instructions for determining that a first connection may have been established between the second node and a third unit of the first node that may be for serving nodes associated with a second service type, and transmitting a handover command to the third unit based on the service type of the second node, where the second connection may be established based on the handover command.

In some examples of the method, apparatuses, and non-transitory computer-readable medium described herein, receiving the indication of the service type of the second node may include operations, features, means, or instructions for receiving a random access preamble over a set of random access channel resources dedicated to nodes associated with the service type.

Some examples of the method, apparatuses, and non-transitory computer-readable medium described herein may further include operations, features, means, or instructions for transmitting to the second node a system information block indicating the set of random access channel resources dedicated to nodes associated with the service type.

In some examples of the method, apparatuses, and non-transitory computer-readable medium described herein, the second unit of the first node may be located separate from the first unit of the first node and the set of units includes a third unit for serving nodes associated with a second service type that may be co-located with the first unit, and where the second unit may be shared between a set of nodes including the first node.

DETAILED DESCRIPTION

Figure 1:
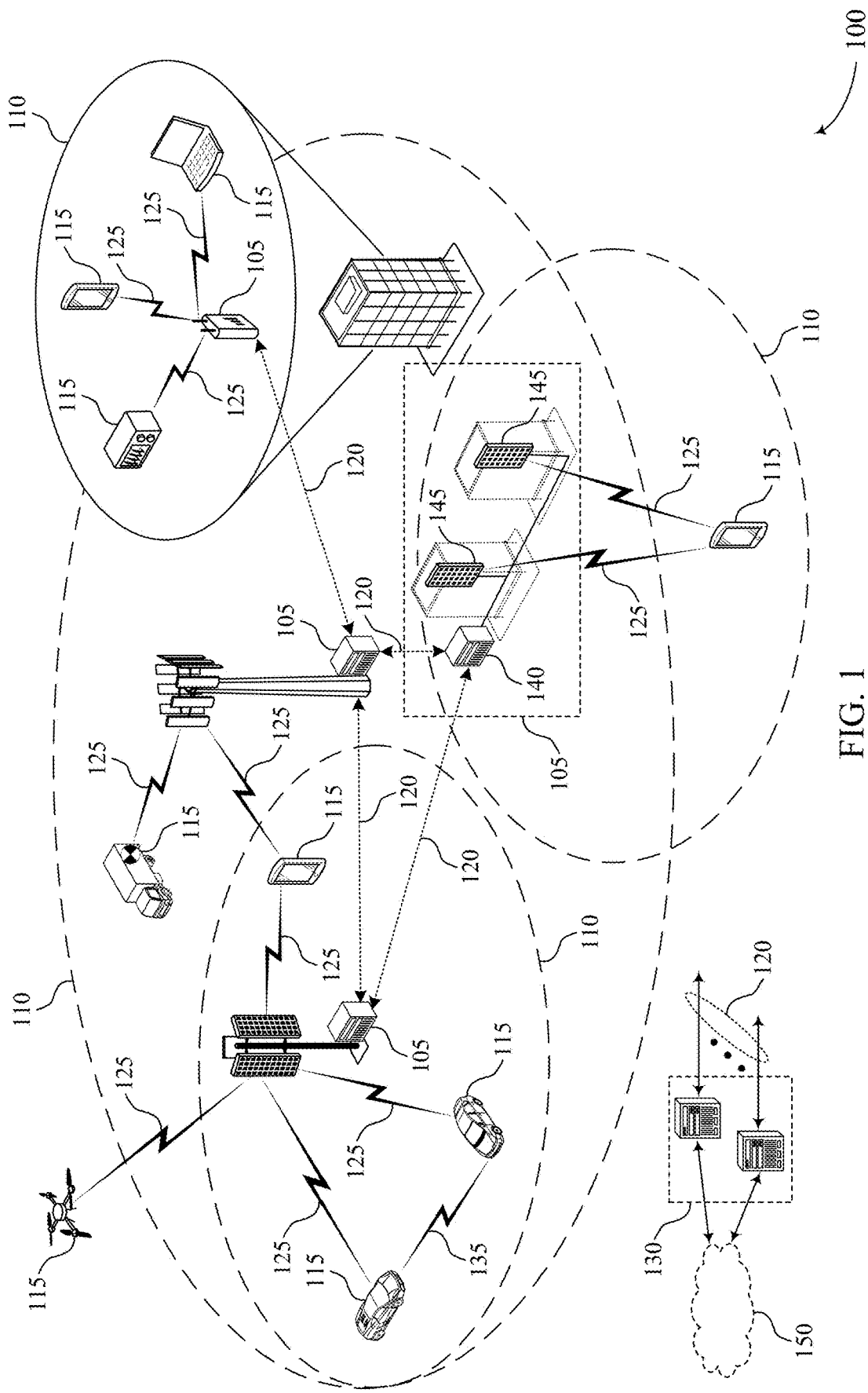
FIG. 1 illustrates an example of a system for wireless communications that supports unit selection for a node in accordance with aspects of the present disclosure.

Some wireless communication systems may support a network, such as an integrated access and backhaul (IAB) network, that includes a first node, such as an IAB donor node, and one or more second nodes, such as relay nodes, downstream from the first node. A first node, such as an IAB donor node, may include a unit, such as a central unit (CU), for controlling the network and may include one or more second units, such as distributed units (DU), for scheduling one or more other nodes, such as other IAB nodes. When a network has mobile nodes, such as mobile IAB nodes, (as opposed to immobile nodes, such as immobile or stationary IAB nodes), the movement of a node may cause it to be handed over from a source node, such as a source donor node, to a target node, such as a target donor node. To complete the handover, information (e.g., UE context information, such as security context information) may be transferred from a first unit of the source node, such as the CU of the source donor node, to a second unit of the target node, such as the CU of the target donor node. But transferring information between the units of different donor nodes may be increase latency and signaling overhead, which may negatively impact system or device performance.

According to the techniques described herein, a source node, such as a source donor node, and a target node, such as a target donor node, may share a unit, such as a CU, so that the transfer of certain information between two nodes is avoided when a node, such as an IAB node, is handed over from the source node to the target node. Thus, inefficient signaling may be avoided, which may improve system and device performance. In addition to the shared unit, such as a shared CU, which may be dedicated to serving a first type of nodes, for example IAB nodes, such as mobile IAB nodes, each node, such as a donor node, may also have a unit, such as a local CU, that is dedicated to serving a second type of node, for example a second type of IAB node, such as immobile IAB nodes. To ensure that a node establishes a connection with the appropriate unit, such as a CU, a node, such as a donor node, may reference the service type associated with the mobile node, such as an IAB node, which may be provided by the node or the core network, among other examples.

Although some aspects of the present disclosure are described with reference to an IAB network and related devices, units, or nodes, the techniques, processes, operations, methods, and apparatuses described herein are more broadly applicable to various networks, devices, units, and nodes in various wireless communication environments and the present disclosure should not be interpreted as limiting unless specifically noted.

Aspects of the disclosure are initially described in the context of wireless communications systems. Aspects of the disclosure are further illustrated by and described with reference to process flows, apparatus diagrams, system diagrams, and flowcharts that relate to unit selection for a node.

FIG. 1 illustrates an example of a wireless communications system 100 that supports unit selection for a node in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, the wireless communications system 100 may be an example of a network, for example a wireless backhaul communications network, such as an IAB network, among other various examples. An IAB network may include an IAB donor (or "anchor") node and one or more relay (or "intermediate") nodes downstream from the donor node. An IAB network may share resources between access and backhaul links such that access traffic may be relayed on a wireless backhaul link. In some cases, the same technology and techniques may be used for access links and backhaul links. IAB donor nodes may provide access to child UEs and the wireless backhaul functionality to IAB nodes. An IAB donor may include a CU for control of the IAB-network and one or more DUs for scheduling IAB nodes. An IAB donor may have a wireline connection to the core network 130. Downstream from the IAB donor node the network may include one or more IAB nodes (also referred to as one or more of parent nodes, relay nodes, intermediate nodes, or child nodes, depending upon where the node is within the IAB network) within the IAB network, with each wirelessly relaying traffic of one or more other nodes, such as its child nodes (e.g., UEs, or other IAB nodes), to one or more other nodes, such as the parent node (e.g., IAB donor, or IAB node). A UE 115 may connect wirelessly to an IAB donor node that is within range of the UE 115. In some cases, a base station 105 may be an example of a donor IAB node.

In some examples, an IAB node may be a mobile IAB node that is capable of moving from one location to another. When an IAB node changes locations, it may be beneficial for the IAB node to be handed over from a source donor node serving the IAB node to a target IAB node that is better suited to provide connectivity and access to the IAB node given its new location. As part of the handover process, context information for UEs 115 served by the IAB node may be communicated from the CU of the source donor node to the CU of the target donor node. But communicating context information between the CUs of different donor nodes may increase overhead signaling and require various resources, time, and power, which may negatively impact system performance (e.g., the overhead signaling may waste radio resources, increase donor node power consumption, and increase latency, among other disadvantages).

According to the techniques described herein, a source donor node and a target donor node may share a CU so that the transfer of context information between the two donor nodes may be avoided when an IAB node is handed over from the source donor node to the target donor node. The shared CU may be configured to (e.g., dedicated to) serving mobile IAB nodes and may be located separate (e.g., at a distributed server) from the DUs of the donor nodes. In addition to the shared CU, each donor node may also have a local CU that is dedicated to serving immobile IAB nodes. To ensure that a mobile IAB node establishes a connection with the appropriate CU (e.g., the shared CU), a donor node may reference the service type associated with the mobile IAB node, which may indicate the mobility capability of the IAB node. A shared CU may also be referred to as a centralized CU or other suitable terminology.

Although some aspects of the present disclosure are described with reference to an IAB network and related devices, units, or nodes, the techniques, processes, operations, methods, and apparatuses described herein are more broadly applicable to various networks, devices, units, and nodes in various wireless communication environments and the present disclosure should not be interpreted as limiting unless specifically noted.

Figure 2:
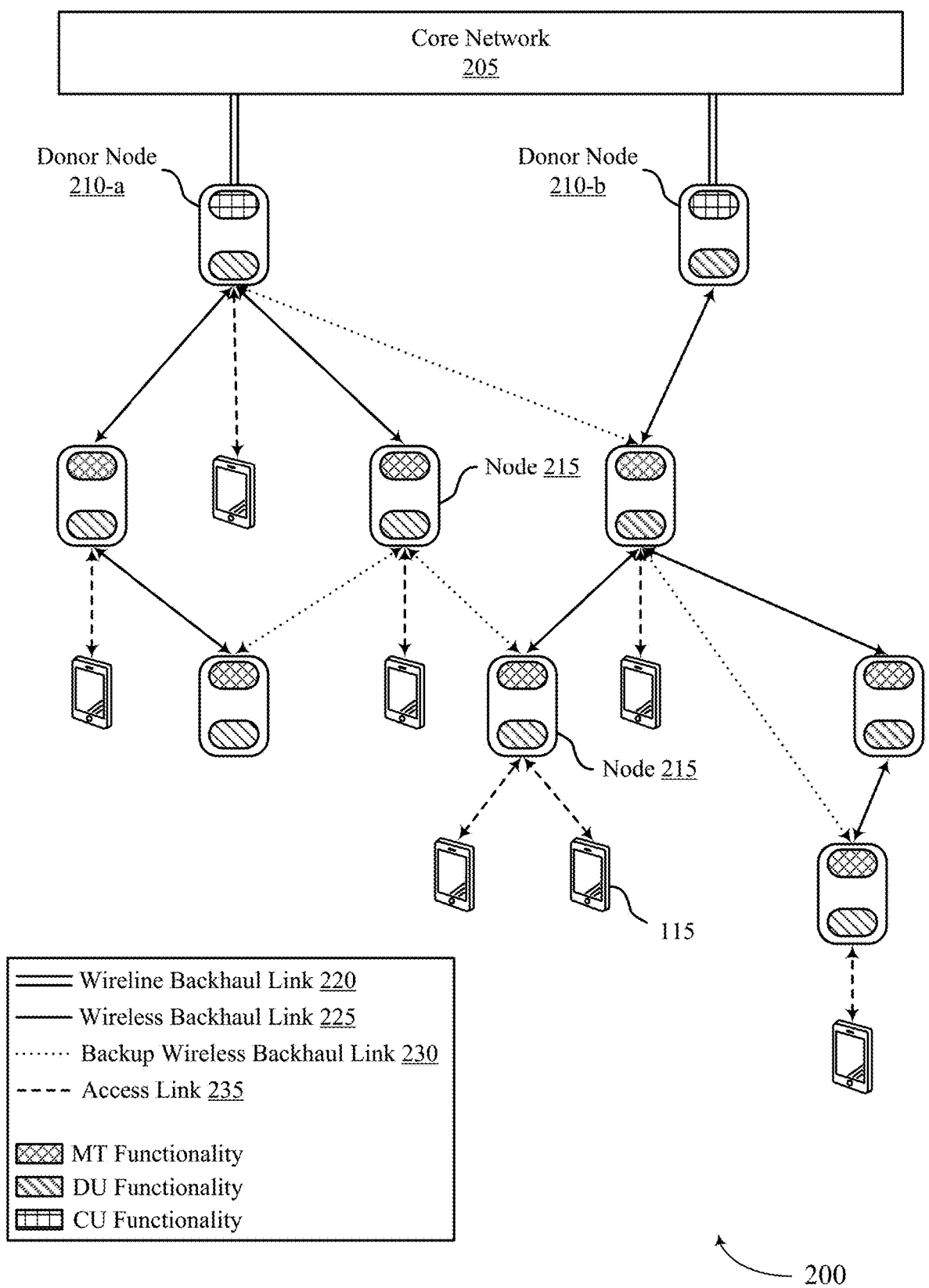
FIG. 2 illustrates an example of a wireless communications system that supports unit selection for a node in accordance with aspects of the present disclosure.

FIG. 2 illustrates an example of a wireless communications system 200 that supports unit selection for a node in accordance with aspects of the present disclosure. Wireless communications system 200 (e.g., a New Radio (NR) system, a millimeter wave (mmW) system) may supplement wireline backhaul connections (e.g., wireline backhaul links 220) by sharing infrastructure and spectral resources for network access with wireless backhaul link capabilities, providing an IAB network architecture. Wireless communications system 200 may include a core network 205 and one or more base stations or supported devices split into one or more support entities (i.e., functionalities) for promoting wireless backhaul density in collaboration with communication access. Aspects of the supporting functionalities of the base stations may be referred to as IAB nodes, such as IAB donor nodes 210 and IAB nodes 215. Wireless communications system 200 may additionally support a number of UEs 115, which may communicate on the uplink with one or more IAB donor nodes 210, IAB nodes 215, or a combination of these devices. In some examples, wireless communications system 200 may implement aspects of wireless communications system 100.

Wireless communications system 200 may include one or more IAB donor nodes 210, which may interface between one or more components in a wireline network and one or more components in a wireless network. In some cases, an IAB donor node 210 may be referred to as an anchor node, as the IAB donor node 210 anchors the wireless network to a wireline connection. For example, each IAB donor node 210 may include at least one wireline backhaul link 220 and one or more additional links (e.g., wireless backhaul links 225, backup wireless backhaul links 230, access links 235).

An IAB donor node 210 may be functionally split into associated base station central unit (CU) and distributed unit (DU) entities (or "functions"), where one or more DUs associated with an IAB donor node 210 may be partially controlled by an associated CU. CUs of IAB donor nodes 210 may host layer 3 (L3) (e.g., RRC, service data adaption protocol (SDAP), PDCP) functionality and signaling. Further, CUs of IAB donor nodes 210 may communicate with the core network 205 over a wireline backhaul link 220 (e.g., which may be referred to as an NG interface). DUs may host lower layer operations, such as layer 1 (L1) or layer 2 (L2) (e.g., RLC, MAC, physical layer) functionality and signaling. A DU entity of an IAB donor node 210 may support a serving cell within the network coverage area according to connections associated with wireless backhaul links 225 and access links 235 of the IAB network. DUs of the IAB donor nodes 210 may control both access and backhaul links within the corresponding network coverage and may provide controlling and scheduling for descendant (i.e., child, relay) IAB nodes 215 and or UEs 115. For example, a DU may support an RLC channel connection with a UE 115 (e.g., via an access link 235) or with an IAB node 215 (e.g., via a backhaul link, such as a primary wireless backhaul link 225 or a backup wireless backhaul link 230). A DU of a node 215 may be responsible for relaying (e.g., transporting, forwarding) messages from another node (e.g., to a CU and/or the core network 205) so that the other node can register with the core network 205 and establish a secure radio resource control (RRC) connection with the CU of a donor node 210.

IAB nodes 215 may, in some examples, be functionally split into associated mobile terminal (MT) and base station DU entities, where MT functionality of the IAB nodes 215 may be controlled or scheduled by antecedent (i.e., parent) IAB nodes via wireless backhaul links. A parent node to an IAB node 215 may be another (antecedent) IAB node 215 or a donor node 210. The MT functionality may be similar to functionality performed by UEs 115 in the system. An IAB node 215 may not be directly connected to a wireline backhaul link 220. Instead, the IAB node 215 may connect to the core network 205 via other IAB nodes (e.g., any number of additional IAB nodes 215 and an IAB donor node 210) using wireless backhaul links. The IAB node 215 may transmit upstream (e.g., towards the core network 205) in the IAB system using MT functionality. In some cases, DUs of the IAB nodes 215 may be partially controlled by signaling messages from CU entities of an associated IAB donor node 210 (e.g., transmitted via an F1-application protocol (F1-AP)). The DUs of the IAB nodes 215 may support serving cells of the network coverage area. For example, a DU of an IAB node 215 may perform the same or similar functions as a DU of an IAB donor node 210, supporting one or more access links 235 for UEs 115, one or more wireless backhaul links for downstream IAB nodes 215, or both. In some examples, an IAB node 215 is a device, such as a base station or UE (e.g., a UE 115 may be an IAB node).

Wireless communications system 200 may employ relay chains for communications within the IAB network architecture. For example, a UE 115 may communicate with an IAB node, and the IAB node may relay the data to a base station CU or the core network 205 either directly or via one or more IAB nodes 215. Each IAB node 215 may include a primary wireless backhaul link 225 for relaying data upstream or receiving information from a base station CU or the core network 205. In some cases, an IAB node 215 may additionally include one or more backup wireless backhaul links 230 (e.g., for redundant connectivity or improved robustness). If the primary wireless backhaul link 225 fails (e.g., due to interference, malfunction at a connected IAB node, movement of IAB nodes, maintenance at IAB nodes), an IAB node 215 may use a backup wireless backhaul link 230 for backhaul communication within the IAB network. The first (e.g., primary) wireless backhaul link 225 may be associated with a coverage area and MT functionality may be controlled or scheduled by a first parent node. The one or more secondary backhaul links (e.g., backup wireless backhaul links 230) may be associated with a non-collocated coverage area and controlled or scheduled by one or more parent nodes.

Each of the primary backhaul connections and the one or more secondary connections may support spectral capabilities to provide network communication over one or more RATs. The one or more IAB nodes may further support base station DU entities and may support multiple backhaul and access links within the relay chain. The DU entities may control or schedule descendant IAB nodes 215 and UEs 115 within the IAB network (e.g., downstream in the IAB network) via the configured backhaul and access links. That is, an IAB node 215 may act as a relay between an IAB donor node 210 and one or more descendant devices (e.g., other IAB nodes 215, UEs 115) in both communication directions based on established backhaul and access connections.

In some examples, an IAB node 215 may be a mobile IAB node (or other type of IAB node) that is capable of moving, for example, from one location to another. When an IAB node 215 changes locations, or for other reasons, it may be beneficial for the IAB node 215 to be handed over from a source IAB donor node (e.g., IAB donor node 210-*a*) to a target IAB node (e.g., IAB donor node 210-*b*) that is better suited to provide connectivity and access to the IAB node 215. As part of the handover process, context information for UEs served by the IAB node 215 may be communicated from the CU of the source IAB donor node 210-*a* to the CU of the target IAB donor node 210-*b*. But communicating context information between the CUs of different IAB donor nodes 210 may increase overhead signaling (e.g., handover signaling to all UEs connected to the IAB node 215), which may negatively impact system performance.

According to the techniques described herein, two nodes in a network, such as the source IAB donor node 210-*a* and the target IAB donor node 210-*b*, may share a unit, such as a CU, so that the transfer of context information between the two nodes, such as the two IAB donor nodes, is avoided when another node, such as an IAB node 215, is handed over from one of the two nodes to the other, such as the source IAB donor node 210-*a* to the target IAB donor node 210-*b*. Such a configuration may logically appear as a single IAB donor node where the CU is common and multiple DUs (one or more belonging to the source, one or more belonging to the target) are connected to the CU.

The shared unit may be dedicated to serving a first type of nodes, such as IAB nodes (e.g., mobile IAB nodes) and may be located separate (e.g., at a distributed server) from other units, such as the DUs of the IAB donor nodes 210. In addition to the shared unit, each IAB donor node 210 may also have a local unit, such as a local CU, that is configured to (e.g., dedicated to) serving a second type of node, such as an IAB node (e.g., immobile IAB nodes). To ensure that a node, such as an IAB node 215, connects to the appropriate unit, such as the appropriate CU, another node, such as an IAB donor node 210, may reference the service type associated with the node, such as the IAB node 215, which may be provided by the node, such as the IAB node 215, or the core network 205.

Although some aspects of the present disclosure are described with reference to an IAB network and related devices, units, or nodes, the techniques, processes, operations, methods, and apparatuses described herein are more broadly applicable to various networks, devices, units and nodes in various wireless communication environments and the present disclosure should not be interpreted as limiting unless specifically noted.

Figure 3:
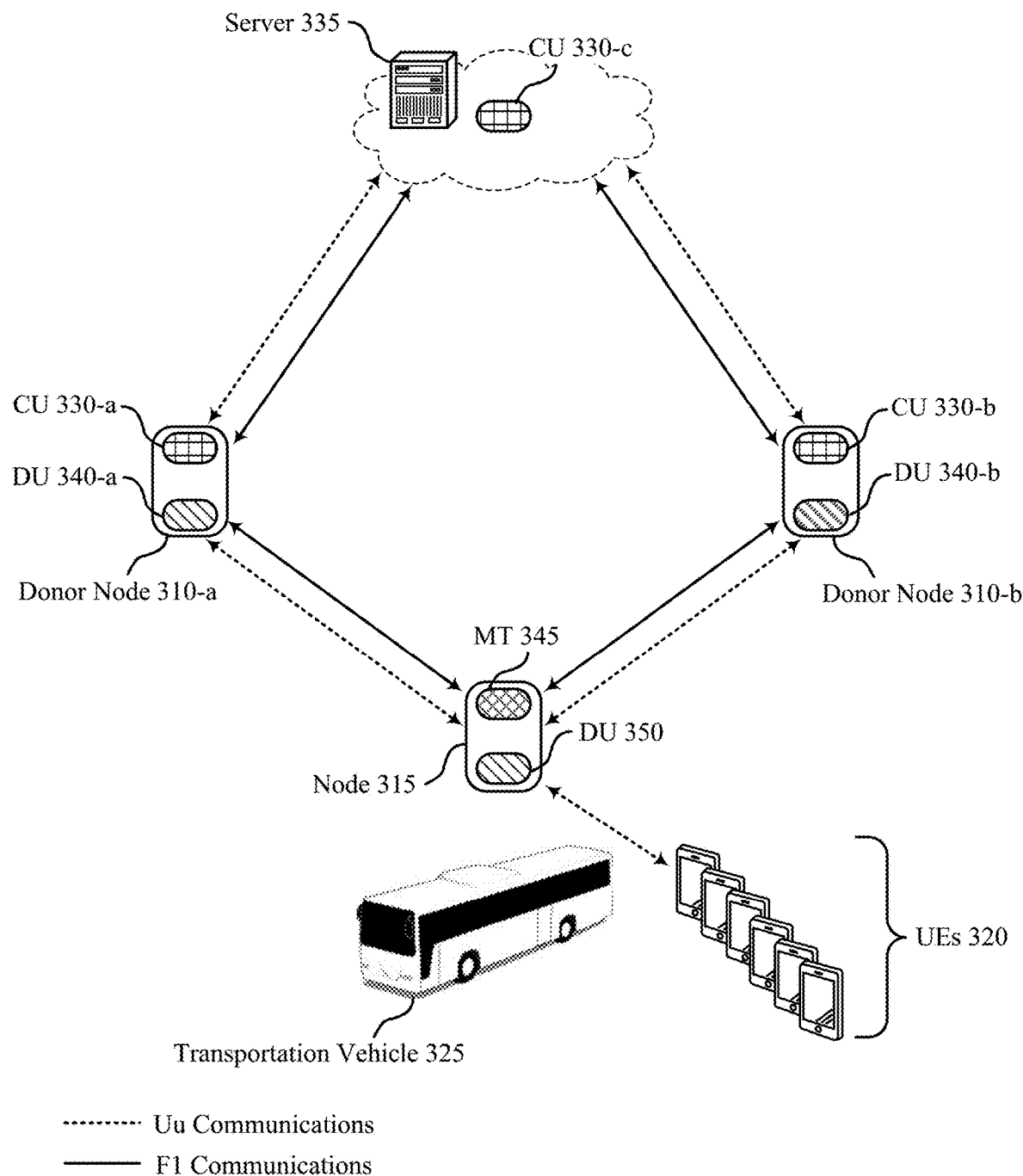
FIG. 3 illustrates an example of a wireless communications system that supports unit selection for a node in accordance with aspects of the present disclosure.

FIG. 3 illustrates an example of a wireless communications system 300 that supports unit selection for a node in accordance with aspects of the present disclosure. Wireless communications system 300 may, in some examples, implement aspects of an IAB network architecture, and thus may include donor nodes 310 and node 315 (e.g., a relay node). Each donor node 310 may include a respective CU 330 and DU 340, which may be examples of CU functionality and DU functionality, respectively, described with reference to FIG. 2. The node 315 may include MT 345 and DU 350, which may be examples of MT functionality and DU functionality, respectively, described with reference to FIG. 2. The donor nodes 310 may share a common CU, such as CU 330-*c*, so that signaling between the donor nodes 310 is reduced during, for example, handovers between the donor nodes 310.

Donor node 310-*a* may serve (e.g., provide wireless connectivity to) node 315, which may be a first type of node (e.g., a mobile node) that serves multiple UEs 320. For example, node 315 may be coupled with a transportation vehicle 325 or other apparatus that travels to various geographic locations. When the node 315 changes location, it may be advantageous to hand over the node 315 from donor node 310-*a* (referred to as the source node) to donor node 310-*b* (referred to as the target node). To serve the node 315, the CU 330-*b* of the donor node 310-*b* may need the context information (e.g., security context information, security keys) for the UEs 320 served by the node 315, among other information. But transferring the context information for the UEs 320 from the CU 330-*a* to the CU 330-*b*, in this manner, may increase overhead signaling during the handover procedure, among other disadvantages.

To avoid signaling context information between CUs, the donor nodes 310 may share a unit, such as a CU, that is configured to (e.g., dedicated to) serving a first type of nodes (e.g., nodes that are associated with a first service type). For example, donor node 310-*a* and donor node 310-*b* may share CU 330-*c*. Thus, each donor node may have two CUs: a first (shared) CU that is dedicated to serving a first type of nodes (e.g., nodes associated with a first service type, such as mobile nodes) and a second CU that is dedicated to serving a second type of nodes (e.g., nodes associated with a second service type, such as immobile nodes). In some examples, the CU dedicated to serving nodes of the second type may be collocated with the DU of a donor node, whereas the CU dedicated to serving the nodes of the first type may be located separate from the DU of the donor node. For example, CU 330-*c* may be a "cloud" CU located at a server 335 that is physically displaced from DU 340-*a* and DU 340-*b*.

By sharing CU 330-*c*, the donor nodes 310 may avoid transferring context information for the UEs 320 during a handover procedure between the donor nodes 310 because the security context information is already at CU 330-*c*. Thus, the handover between donor node 310-*a* and donor node 310-*b* may be considered, for the purposes of UE context information, to be an intra-CU handover as opposed to an inter-CU handover. To ensure that the context information for the UEs 320 is at CU 330-*c* instead of CU 330-*a*, donor node 310-*a* may assist the node 315 with connecting with CU 330-*c* rather than CU 330-*a*, for example, after the node 315 initially registers with the core network. To do so, the donor node 310-*a* may implement aspects of process flow 400, process flow 500, or process flow 600, or any combination thereof, as described with reference to FIGS. 4, 5, and 6, respectively.

It should be appreciated that the nodes and units in wireless communications system 300 may communicate over a Uu interface and an F1 interface, among other interfaces. For example, the DU 350 may communicate with the CU of a donor node over the F1 interface, which may include a control plane (e.g., F1-C) and a user plane (e.g., F1-U). The MT 345 of the node 315 may communicate with a donor node over the Uu interface. The F1 interface and the Uu interface may also be used to communicate between the donor nodes and CU 330-*c*. Thus, the node and units in the wireless communications system 300 may use F1 communications and Uu communications to exchange information. Although some aspects of the present disclosure are described with reference to an IAB network and related devices, units, or nodes, the techniques, processes, operations, methods, and apparatuses described herein are more broadly applicable to various networks, devices, units, and nodes in various wireless communication environments and the present disclosure should not be interpreted as limiting unless specifically noted.

Figure 4:
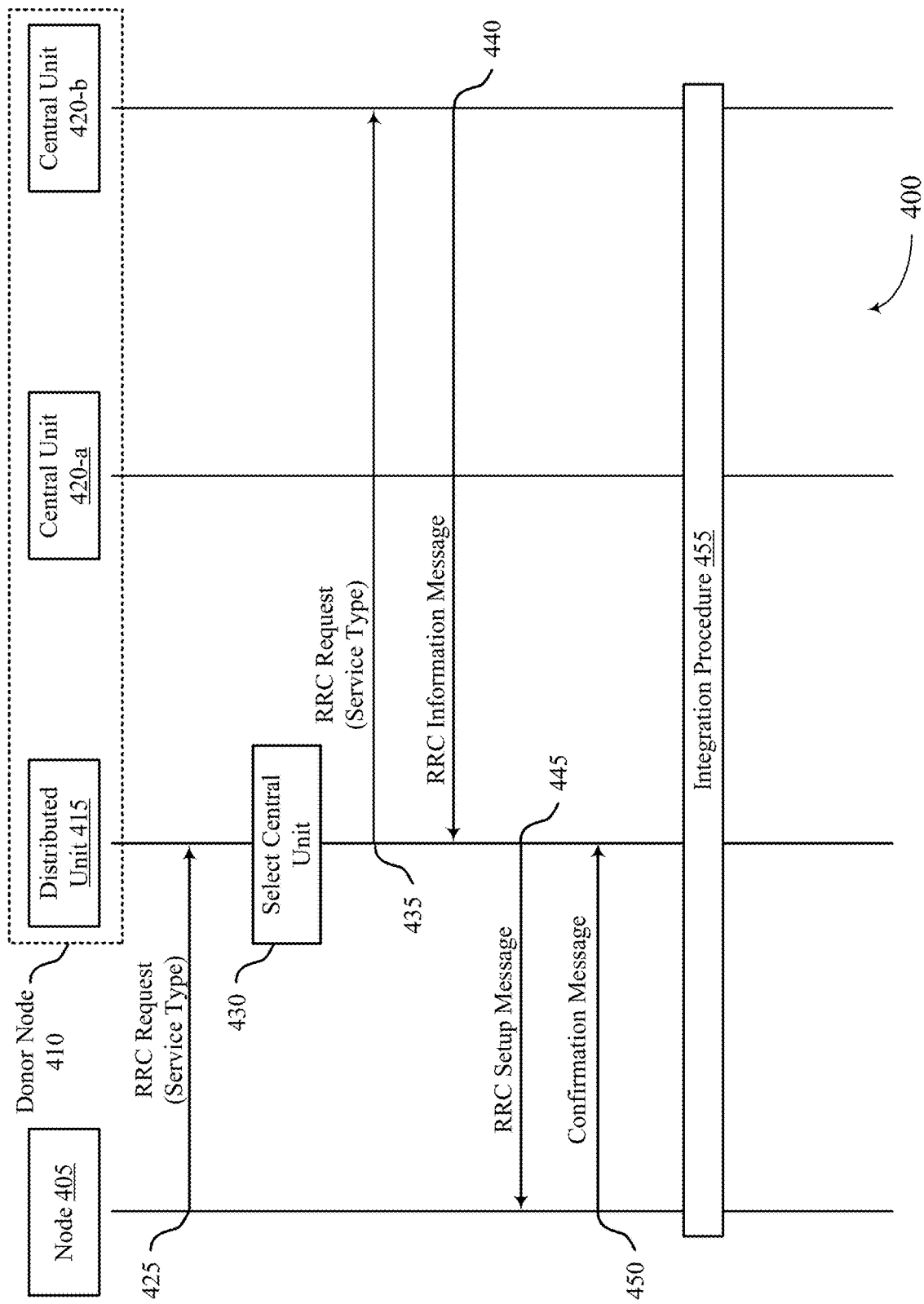
FIG. 4 illustrates an example of a process flow that supports unit selection for a node in accordance with aspects of the present disclosure.

FIG. 4 illustrates an example of a process flow 400 that supports unit selection for a node in accordance with aspects of the present disclosure. Process flow 400 may, in some examples, be implemented by devices in an IAB network, such as node 405 (e.g., a relay node) and donor node 410. Donor node 410 may include a distributed unit 415, a central unit 420-*a*, and a central unit 420-*b*. The central unit 420-*a* may be dedicated to serving a first type of nodes (e.g., nodes associated with a first service type, such as immobile nodes) and the central unit 420-*b* may be dedicated to serving a second type of nodes (e.g., nodes associated with a second service type, such as mobile nodes). In some examples node 405 is a UE or other type of device.

In some examples, the central unit 420-*a* may be exclusive to (e.g., dedicated to) the donor node 410 whereas the central unit 420-*b* may be shared with another donor node (or multiple other donor nodes). Although physically the donor node 410 may be considered as including the distributed unit 415 and the central units 420, logically or conceptually the donor node 410 may be considering as including the distributed unit 415, the central units 420, and one or more additional distributed units that (physically) belong to one or more different donor nodes. Thus, the distributed unit 415 may be considered as sharing multiple central units 420. In some examples, the central unit 420-*a* may be collocated with (e.g., coupled with) the distributed unit 415 and the central unit 420-*b* may be physically separated from the distributed unit 415. Alternatively, the central unit 420-*b* may be collocated with the distributed unit 415.

When node 405 is a mobile node, the donor node 410 may assist the node 405 with connecting with the central unit 420-*b* (e.g., rather than the central unit 420-*a*) to ensure that the context information for UEs served by the node 405 is present at the central unit 420-*b* when a handover procedure occurs. If the central unit 420-*b* is shared with the target donor node for the handover procedure, the existence of the context information at the central unit 420-*b* may reduce overhead signaling between the donor node 410 and the target donor node during the handover procedure, among other advantages.

At 425, the node 405 may transmit to the distributed unit 415 a request to establish connectivity (e.g., radio resource control (RRC) connectivity) with the donor node 410. The request may include an indication of the service type associated with the node 405. In some examples, the node 405 may be a mobile node and the service type may indicate a mobility capability of the node 405. Thus, the node 405 may in some examples determine the service type associated with the node 405 before initiating a random access procedure. In some examples, the request may be an RRCSetupRequest message (e.g., Message 3) of a random access procedure. Alternatively, the node 405 may in some examples determine the service type associated with the node 405 after initiating a random access procedure.

The service type may be indicated explicitly or implicitly. For example, the service type may be explicitly indicated by one or more bits reserved bits or a cause code (e.g., included in Message 3). In some examples, one or more bits reserved for the identifier (ID) of the node 405 (or reserved for an ID of a UE served by the node 405) may be re-purposed to explicitly indicate the service type. For instance, the ID included in Message 3 may be shortened by x bits and those x bits may be used to indicate the service type. In some examples, the x bits are the least significant bits (LSB) or the most significant bits (MSB) of the ID. When x bits of an ID are used to indicate the service type, the retained bits for the ID may be enough for contention resolution and the remaining bits for the ID may be included in a subsequent message (e.g., Message 5).

In some examples, the service type may be indicated earlier in the random access procedure than depicted in process flow 400. For example, the service type may be implicitly indicated by the set of random access resources (e.g., random access channel (RACH) resources) used by the node 405 to transmit a random access preamble, which may initiate the random access procedure. The set of random access resources may be reserved for nodes of the first type (e.g., mobile nodes), whereas a different set of random access resources may be reserved for nodes of the second type (e.g., immobile nodes). In some examples, the donor node 410 may configure or indicate the set(s) of random access resources associated with different services via a system information block (e.g., SIB1) that is broadcast by the donor node 410.

At 430, the distributed unit 415 may select a central unit to satisfy the request based on the service type associated with the node 405, among one or more other criteria. For example, if the node 405 is an immobile node, the distributed unit 415 may select the central unit 420-*a*. As another example, if the node 405 is a mobile node, the distributed unit 415 may select the central unit 420-*b*. In some examples, each central unit 420 may be configured to process radio resource control messages (as opposed to the distributed unit 415).

At 435, the distributed unit 415 may transmit (e.g., forward, relay, or otherwise indicate) the request for connectivity to the selected central unit (e.g., central unit 420-b) for processing. The request may include an indication of the service type associated with the node 405. In some examples, the request may be an F1-Initial UL RRC message that includes information for the RRC connection, such as the gNB-CU UE F1-AP ID, the NR cell global identity ($CGI_A$) associated with the donor node 410 or the central unit 420-b (which may include the base station ID and/or the cell ID associated with the donor node 410 or the central unit 420-b), the cell-radio network temporary identifier (C-RNTI) of the cell associated with the donor node 410, and/or the RRC container, among other information.

At 440, the central unit 420-b may transmit to the distributed unit 415 an RRC information message based on the request received at 435. In some examples, the RRC information message may be an F1-DL RRC transfer message that includes information for the RRC connection, such as the gNB-CU/DU UE F1AP ID, the signaling radio bearer (SRB) ID, and/or the RRC container, among other information. In some example, the information in the RRC information message and/or the transmission of the RRC information message is based on the service type associated with the node 405.

At 445, the distributed unit 415 may transmit to the node 405 an RRC setup message provided by the central unit 420-b based on the RRC information message received at 440. The RRC setup message may include information for the RRC connection. In some examples, the RRC setup message is an RRCSetup message (e.g., Message 4) of a random access procedure. At 450, the node 405 may transmit to the distributed unit 415 a confirmation message based on the RRC setup message received at 445. The confirmation message may indicate that the node 405 has established an RRC connection with the central unit 420-b based on the information in the RRC setup message. Thus, the node 405 may establish an RRC connection with the central unit 420-b of the donor node 410, which may allow for handovers between donors nodes ("inter-donor node handovers") that reduce overhead signaling. For example, upon establishment of the RRC connection the central unit 420-b may establish or obtain context information for UEs served by the node 405 that, due to the shared nature of the central unit 420-b, need not be transferred to another central unit during an inter-donor node handover.

In some examples, the distributed unit 415 may transmit an indication of the service type associated with the node 405 to the core network so that the core network can verify the service type. The distributed unit 415 may transmit the indication to the core network after the node 405 and the central unit 420-a establish the RRC connection, or at another time during the process flow 400. In response to transmitting the indication, the distributed unit 415 may receive from the core network a message affirming or denying the service type provided by the node 405. The core network may verify the service type associated with the node 405 based on a subscription profile (e.g., an IAB node subscription profile) for the node 405. Thus, the core network may authorize the central unit 420-b to provide service to the node 405.

After establishing the RRC connection with the central unit 420-b, the distributed unit 415 may relay messages between the node 405, and the central unit 420-b (and possibly the core network) so that the relevant devices can perform integration procedure 455. The integration procedure 455 may involve multiple sub-procedures, such a registration procedure, a radio link control (RLC) channel and F1 setup procedure, and/or an authentication procedure, among others.

Thus, the donor node 410 may assist the node 405 with connecting with the central unit 420-b (rather than the central unit 420-a) to ensure that the context information for UEs served by the node 405 is present at the central unit 420-b when a handover procedure occurs. Although described with respect to an RRC connection, the techniques described herein can be implemented for other types of connections.

Alternative examples of the process flow 400 may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle. Although some aspects of the present disclosure are described with reference to an IAB network and related devices or nodes, the techniques, processes, operations, methods, and apparatuses described herein are more broadly applicable to various networks, devices, and nodes in various wireless communication environments and the present disclosure should not be interpreted as limiting unless specifically noted.

Figure 5:
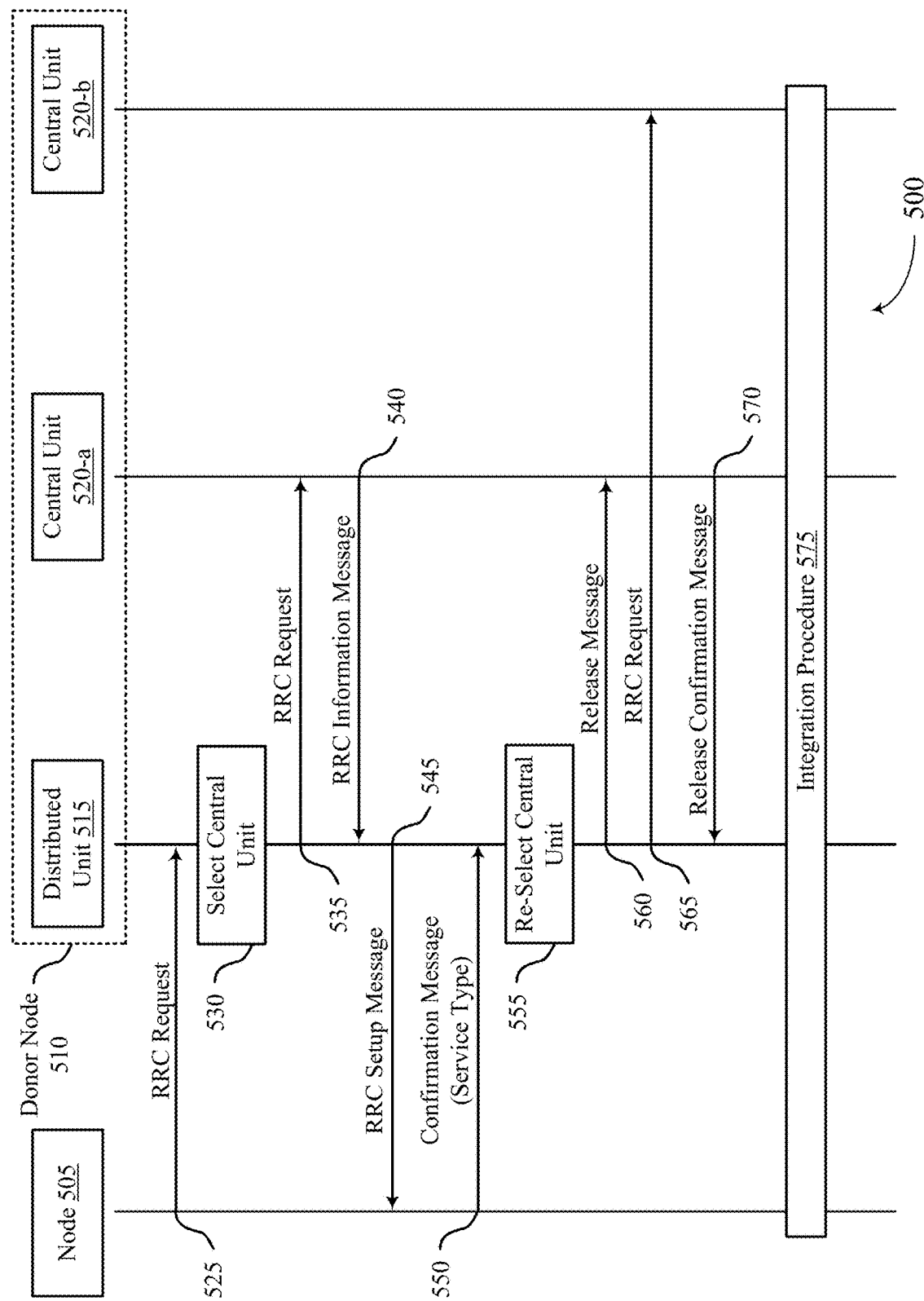
FIG. 5 illustrates an example of a process flow that supports unit selection for a node in accordance with aspects of the present disclosure.

FIG. 5 illustrates an example of a process flow 500 that supports unit selection for a node in accordance with aspects of the present disclosure. Process flow 500 may, in some examples, be implemented by devices in an IAB network, such as node 505 (e.g., a relay node) and donor node 510. Donor node 510 may include a distributed unit 515, a central unit 520-a, and a central unit 520-b. The central unit 520-a may be dedicated to serving a first type of nodes (e.g., nodes associated with a first service type, such as immobile nodes) and the central unit 520-b may be dedicated to serving a second type of nodes (e.g., nodes associated with a second service type, such as mobile nodes). In some examples node 505 is a UE or other type of device.

In some examples, the central unit 520-a may be dedicated exclusively to the donor node 510 whereas the central unit 520-b may be shared with another donor node (or multiple other donor nodes). Although physically the donor node 510 may be considered as including the distributed unit 515 and the central units 520, logically or conceptually the donor node 510 may be considering as including the distributed unit 515, the central units 520, and one or more additional distributed units that (physically) belong to one or more different donor nodes. Thus, the distributed unit 515 may be considered as sharing multiple central units 520. In some examples, the central unit 520-a may be collocated with the distributed unit 515 and the central unit 520-b may be physically separated from the distributed unit 515. Alternatively, the central unit 520-b may be collocated with the distributed unit 515.

The donor node 510 may assist the node 505 with connecting with the central unit 520-b (rather than the central unit 520-a) to ensure that the context information for UEs served by the node 505 is present at the central unit 520-b when a handover procedure occurs. If the central unit 520-b is shared with the target donor node for the handover procedure, the existence of the context information at the central unit 520-b may reduce overhead signaling between the donor node 510 and the target donor node during the handover procedure.

At 525, the node 505 may transmit to the distributed unit 515 a request to establish connectivity (e.g., RRC connectivity) with the donor node 510. In some examples, the request may be an RRCSetupRequest message (e.g., Message 3) of a random access procedure. At 530, the distributed unit 515 may select a random or default central unit (e.g., central unit 520-*a*) based on the request received at 525. In some examples, the distributed unit 515 may select the random or default central unit because the donor node 410 lacks certain public land mobile network (PLMN) information.

At 535, the distributed unit 515 may transmit (e.g., forward, relay, or otherwise indicate) the request for RRC connectivity to the selected central unit (e.g., central unit 520-*a*). In some examples, the request may be an F1-Initial UL RRC message that includes information for the RRC connection, such as the gNB-CU UE F1AP ID, the NR $CGI_A$ (which may include the base station ID and/or the cell ID associated with the donor node 510 or the central unit 520-*a*), the cell-radio network temporary identifier (C-RNTI), and/or the RRC container, among other information.

At 540, the central unit 520-*a* may transmit to the distributed unit 515 an RRC information message based on the request received at 535. In some examples, the RRC information message may be an F1-DL RRC transfer message that includes information for the RRC connection, such as gNB-CU/DU UE F1AP ID, the SRB ID, and/or the RRC container, among other information.

At 545, the distributed unit 515 may transmit to the node 505 an RRC setup message based on the RRC information message received at 540. The RRC setup message may include information for the RRC connection. In some examples, the RRC setup message is an RRCSetup message (e.g., Message 4) of a random access procedure.

At 550, the node 505 may transmit to the distributed unit 515 a confirmation message based on the RRC setup message received at 545. The confirmation message may include an indication of the service type associated with the node 505. In some examples, the node 505 may be a mobile node and the service type may indicate a mobility capability of the node 505. The confirmation message may indicate that the node 505 has established an RRC connection with the central unit 520-*a* based on the information in the RRC setup message. Thus, the central unit 520-*a* may establish a first RRC connection with the node 505, and in doing so determine context information associated with the node 505 (e.g., context information for the node 505 and/or context information for UEs served by the node 505).

At 555, the distributed unit 515 may re-select a central unit based on the service type associated with the node 505. For example, the distributed unit 515 may select the central unit 520-*b* based on the node 505 being a mobile node. At 560, the distributed unit 515 may transmit to the central unit 520-*a* a release message indicating that the central unit 520-*a* is to release the context information and/or the first RRC connection associated with the node 505. In some examples, the release message is an F1-UE Context Release Request message that indicates information (e.g., the gNB-CU UE F1AP ID) about the context information and/or RRC connection to be released. In some examples, the release message may indicate the reason for the release (e.g., the release message may indicate that the release is due to the service type of the node 505).

At 565, the distributed unit 515 may transmit (e.g., forward, relay, or otherwise indicate) to the central unit 520-*b* the request for RRC connectivity. For example, the distributed unit 515 may forward Message 3 and/or Message 5 to the central unit 520-*b*. The distributed unit 515 may transmit the request based on the selection of the central unit 520-*b* at 555. In some examples, the request may be an F1-Initial UL RRC message that includes information for the RRC connection, such as the gNB-CU UE F1AP ID, the NR $CGI_B$ (which may be the same or different relative to the NR $CGI_A$), the C-RNTI, and the RRC container, among other information. The NR $CGI_B$ may include the base station ID and/or the cell ID associated with the donor node 510 or the central unit 520-*b*. At 570, the central unit 520-*a* may transmit to the distributed unit 515 a release confirmation message that indicates the central unit 520-*a* has released the context information and/or first RRC connection associated with the node 505.

Thus, a second RRC connection may be established between the node 505 and the central unit 520-*b*, which may allow for inter-donor node handovers that reduce overhead signaling. For example, upon establishment of the RRC connection the central unit 520-*b* may establish or obtain context information for UEs served by the node 505 that, due to the shared nature of the central unit 520-*b*, need not be transferred to another central unit during an inter-donor node handover. In some examples, the context information for the UEs may be transferred from the central unit 520-*a* to the central unit 520-*b* (e.g., via an inter-CU tunnel).

After establishing the RRC connection with the central unit 520-*b*, the distributed unit 515 may relay messages between the node 505, and the central unit 520-*b* (and possibly the core network) so that the relevant devices can perform integration procedure at 575. The integration procedure may involve multiple sub-procedures, such a registration procedure, an RLC channel and F1 setup procedure, and/or an authentication procedure, among others.

Thus, the donor node 510 may assist the node 505 with connecting with the central unit 520-*b* (rather than the central unit 520-*a*) so that the context information for UEs served by the node 505 is present at the central unit 520-*b* when an inter-donor node handover procedure occurs. Although described with respect to an RRC connection, the techniques described herein can be implemented for other types of connections. Alternative examples of the process flow 500 may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle. Although some aspects of the present disclosure are described with reference to an IAB network and related devices or nodes, the techniques, processes, operations, methods, and apparatuses described herein are more broadly applicable to various networks, devices, and nodes in various wireless communication environments and the present disclosure should not be interpreted as limiting unless specifically noted.

Figure 6:
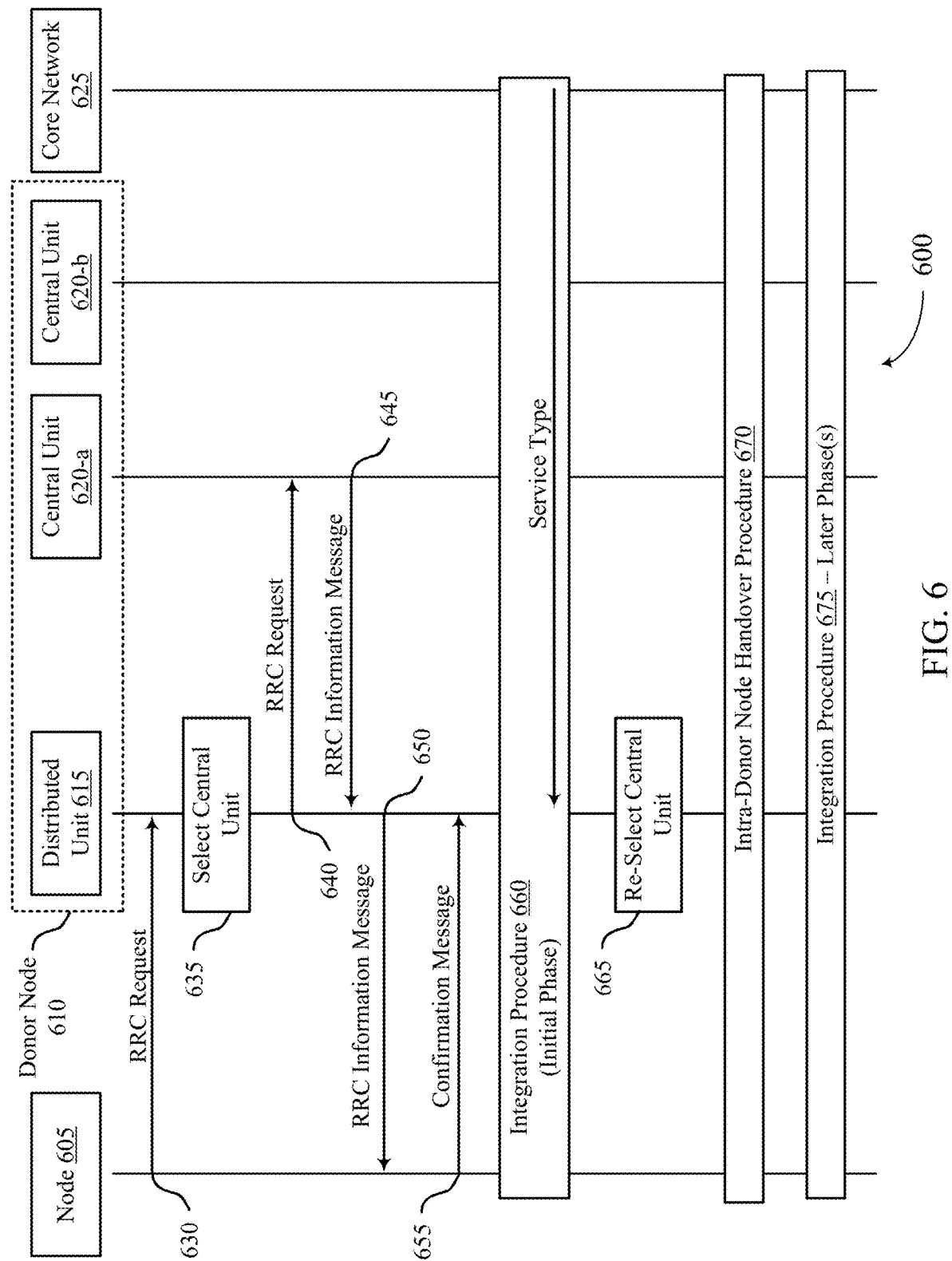
FIG. 6 illustrates an example of a process flow that supports unit selection for a node in accordance with aspects of the present disclosure.

FIG. 6 illustrates an example of a process flow 600 that supports unit selection for a node in accordance with aspects of the present disclosure. Process flow 600 may, in some examples, be implemented by devices in an IAB network, such as node 605 (e.g., a relay node) and donor node 610. Donor node 610 may include a distributed unit 615, a central unit 620-*a*, and a central unit 620-*b*. The central unit 620-*a* may be dedicated to serving a first type of nodes (e.g., nodes associated with a first service type, such as immobile nodes) and the central unit 620-*b* may be dedicated to serving a second type of nodes (e.g., nodes associated with a second service type, such as mobile nodes). In some examples node 605 is a UE or other type of device.

In some examples, the central unit 620-*a* may be exclusive to the donor node 610 whereas the central unit 620-*b* may be shared with another donor node (or multiple other donor nodes). Although the physically the donor node 610 may be considered as including the distributed unit 615 and the central units 620, logically or conceptually the donor node 610 may be considering as including the distributed unit 615, the central units 620, and one or more additional distributed units that (physically) belong to one or more different donor nodes. Thus, the distributed unit 615 may be considered as sharing multiple central units 620. In some examples, the central unit 620-*a* may be collocated with the distributed unit 615 and the central unit 620-*b* may be physically separated from the distributed unit 615. Alternatively, the central unit 620-*b* may be collocated with the distributed unit 615.

The donor node 610 may assist the node 605 with connecting with the central unit 620-*b* (rather than the central unit 620-*a*) to ensure that the context information for UEs served by the node 605 is present at the central unit 620-*b* when a handover procedure occurs. If the central unit 620-*b* is shared with the target donor node for the handover procedure, the existence of the context information at the central unit 620-*b* may reduce overhead signaling between the donor node 610 and the target donor node during the handover procedure.

At 630, the node 605 may transmit to the distributed unit 615 a request to establish connectivity (e.g., RRC connectivity) with the donor node 610. In some examples, the request may be an RRCSetupRequest message (e.g., Message 3) of a random access procedure. At 635, the distributed unit 615 may select a random or default central unit (e.g., central unit 620-*a*) based on the request received at 630.

At 640, the distributed unit 615 may transmit (e.g., forward, relay, or otherwise indicate) the request for RRC connectivity to the selected central unit (e.g., central unit 620-*a*). In some examples, the request may be an F1-Initial UL RRC message that includes information for the RRC connection, such as the gNB-CU UE F1AP ID, the NR $CGI_A$, the C-RNTI, and/or the RRC container, among other information.

At 645, the central unit 620-*a* may transmit to the distributed unit 615 an RRC information message based on the request received at 640. In some examples, the RRC information message may be an F1-DL RRC transfer message that includes information for the RRC connection, such as gNB-CU/DU UE F1AP ID, the SRB ID, and/or the RRC container, among other information.

At 650, the distributed unit 615 may transmit to the node 605 an RRC setup message based on the RRC information message received at 645. The RRC setup message may include information for the RRC connection. In some examples, the RRC setup message is an RRCSetup message (e.g., Message 4) of a random access procedure. At 655, the node 605 may transmit to the distributed unit 615 a confirmation message based on the RRC setup message received at 645. The confirmation message may indicate that the node 605 has established an RRC connection with the central unit 620-*a* based on the information in the RRC setup message. Thus, the central unit 620-*a* may establish a first RRC connection with the node 605. In some examples, the central unit 620-*a* may also determine context information associated with the node 605 (e.g., context information for the node 605 and/or context information for UEs served by the node 605).

At 660, the node 605 may perform (e.g., via the donor node 610) a first (e.g. initial) phase of an integration procedure with the core network 625. The initial phase of the integration procedure may include a registration procedure and may be based on the establishment of the first RRC connection between the node 605 and the central unit 620-*a*. During the registration procedure, the distributed unit 615 may receive from the core network (e.g., from the AMF) an indication of the service type associated with the node 605. In some examples, the node 605 may be a mobile node and the service type may indicate a mobility capability of the node 605. Furthermore, access-stratum (AS) security may be established between the node 605 and the central unit 620-*a*, whereby the radio resource control signaling is security protected At 665, the distributed unit 565 may re-select a central unit based on the service type associated with the node 605. For example, the distributed unit 615 may select the central unit 620-*b* based on the node 605 being a mobile node. At 670, the node 605 and the donor node 610 (e.g., the central unit 620-*a* and the central unit 620-*b*) may participate in a handover procedure that is seen as an intra-cell handover from the perspective of the node 605. During the handover procedure, a second RRC connection may be established between the node 605 and the central unit 620-*b* and the context information (e.g., security keys) associated with the node 605 may be transferred from the central unit 620-*a* to the central unit 620-*b* (e.g., via an inter-CU tunnel). In some examples, the distributed unit 615 may trigger the handover procedure by transmitting respective handover requests to the central unit 620-*a* and the central unit 620-*b*. Thus, a second RRC connection may be established between the node 605 and the central unit 620-*b* and the context information associated with the node 605 may be obtained by the central unit 620-*b*.

After establishing the RRC connection with the central unit 620-*b*, the distributed unit 615 may relay messages between the node 605, the central unit 620-*b* and the core network so that the relevant devices can perform a second (e.g., later) phase of the integration procedure at 675. The later phase of the integration procedure may include an authentication procedure, RLC channel setup, and/or F1 channel setup, among other sub-procedures.

Thus, the donor node 510 may assist the node 605 with connecting with the central unit 620-*b* (rather than the central unit 620-*a*) so that the context information for UEs served by the node 605 is present at the central unit 620-*b* when an inter-donor node handover procedure occurs. Although described with respect to an RRC connection, the techniques described herein can be implemented for other types of connections. Alternative examples of the process flow 600 may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

In some examples, aspects of the techniques described herein may be modified to be compatible with other types of networks (e.g., networks such as legacy networks that do not support mobile IAB nodes or that support various types of nodes). In a first example related to registration, a donor node may select a CU from the cloud IAB radio access network (RAN) dedicated to IAB if the service type indicates a mobile IAB node. In such a scenario, the interface to the cloud IAB RAN may be preconfigured at the donor node, N2 may be moved from the donor node to the cloud CU, and the IAB RAN topology may be transparent from the perspective of other donor nodes (e.g., the donor node CU may be seen by other donor nodes as a single donor node CU). Additionally, the donor node serving a mobile node may assume the DU role for the mobile node (e.g., the donor node may relay Uu and F1 communications between the node and the cloud CU). If the IP address of the node or the donor node changes, a new F1 interface may be setup (or a proprietary process may be used to avoid establishing the new F1 interface).

In a second example related to IAB node handover from a legacy donor node (e.g., a donor node that does not support mobile nodes) to a non-legacy donor node (e.g., a donor node that supports mobile nodes), the target donor node may interact with the cloud CU to construct the handover command (e.g., the handover procedure may be tunneled to the cloud CU). In a third example related to IAB node handover from a non-legacy donor node to a legacy donor node, the cloud CU may perform a normal handover procedure with nodes and UEs connected via IAB nodes based on the legacy donor node's inability to support mobile nodes.

Although some aspects of the present disclosure are described with reference to an IAB network and related devices or nodes, the techniques, processes, operations, methods, and apparatuses described herein are more broadly applicable to various networks, devices, and nodes in various wireless communication environments and the present disclosure should not be interpreted as limiting unless specifically noted.

Figure 7:
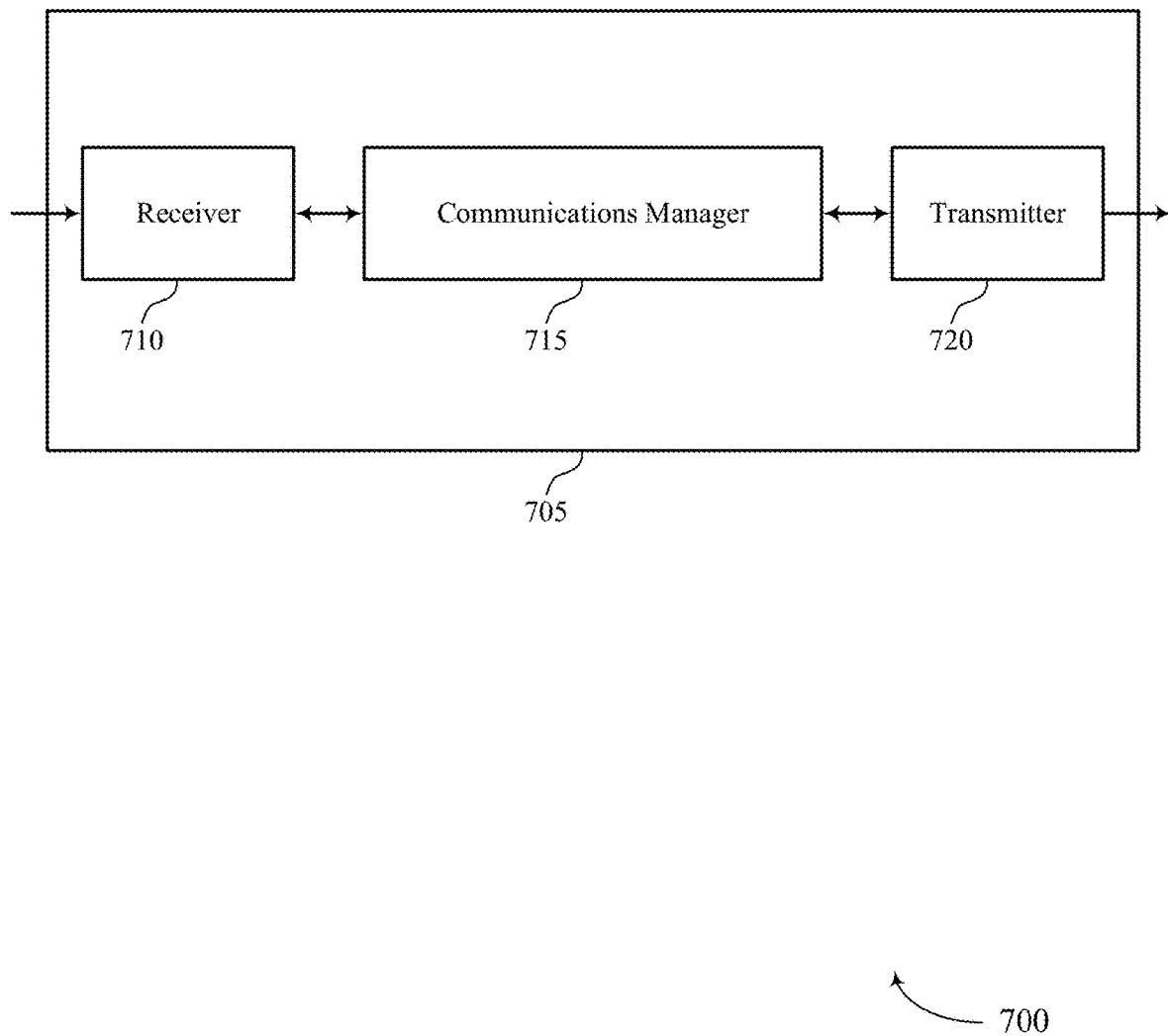
FIGS. 7 and 8 show block diagrams of devices that support unit selection for a node in accordance with aspects of the present disclosure.

FIG. 7 shows a block diagram 700 of a device 705 that supports unit selection for a node in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to unit selection for a node). Information may be passed on to other components of the device 705. The receiver 710 may be an example of aspects of the transceiver 1020 described with reference to FIG. 10. The receiver 710 may utilize a single antenna or a set of antennas.

The communications manager 715 may determine a service type of the first node, the service type indicating that the first node is a mobile node, transmit, to a second node during a random access procedure, an indication of the service type of the first node, and establish a connection with a unit of the second node for serving nodes of the wireless network associated with the service type based on transmitting the indication of the service type during the random access procedure. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
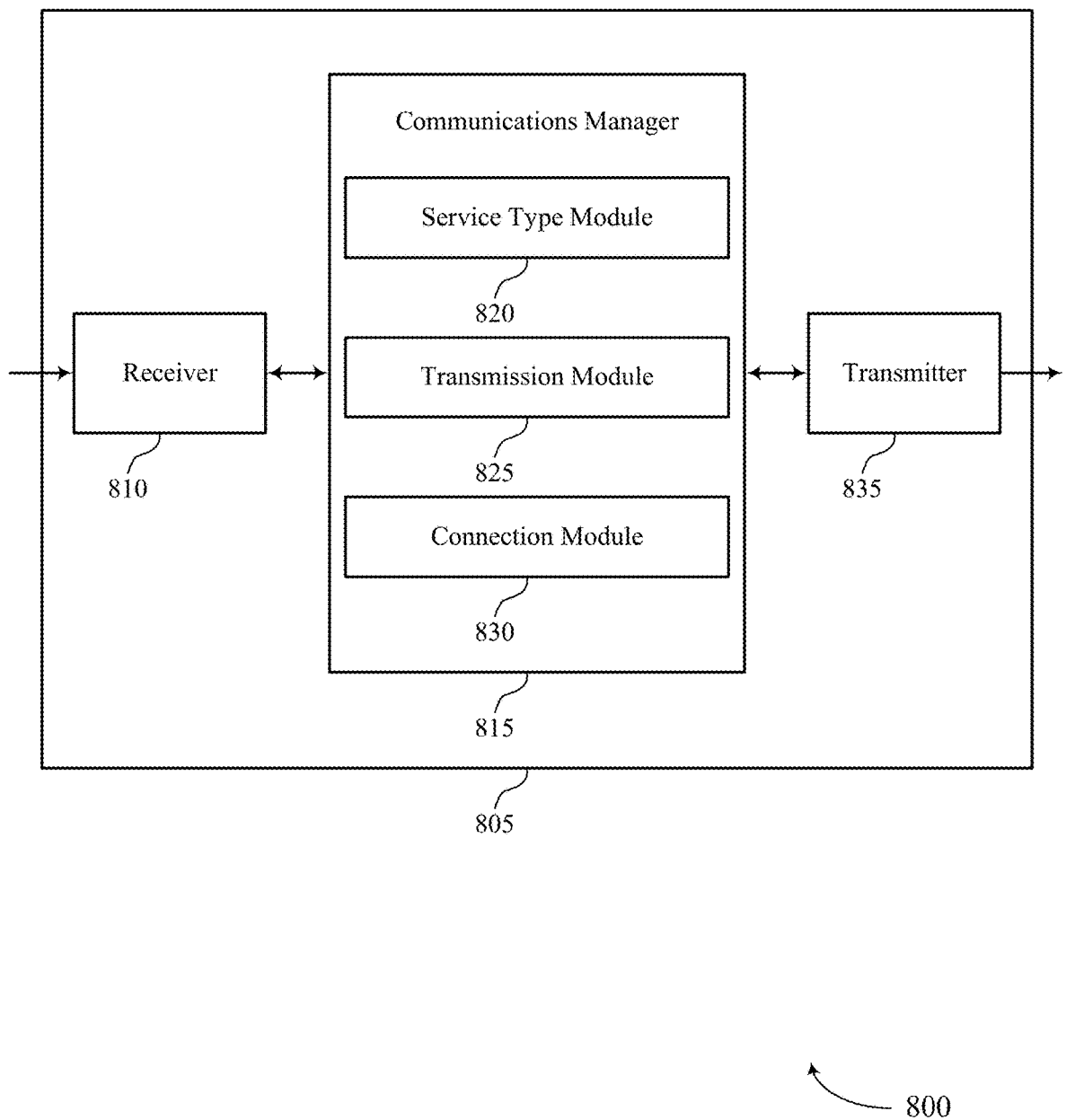

FIG. 8 shows a block diagram 800 of a device 805 that supports unit selection for a node in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to unit selection for a node). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a service type module 820, a transmission module 825, and a connection module 830. The communications manager 815 may be an example of aspects of the communications manager 1010 described herein.

The service type module 820 may determine a service type of the first node, the service type indicating that the first node is a mobile node. The transmission module 825 may transmit, to a second node during a random access procedure, an indication of the service type of the first node. The connection module 830 may establish a connection with a unit of the second node for serving nodes of the wireless network associated with the service type based on transmitting the indication of the service type during the random access procedure.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
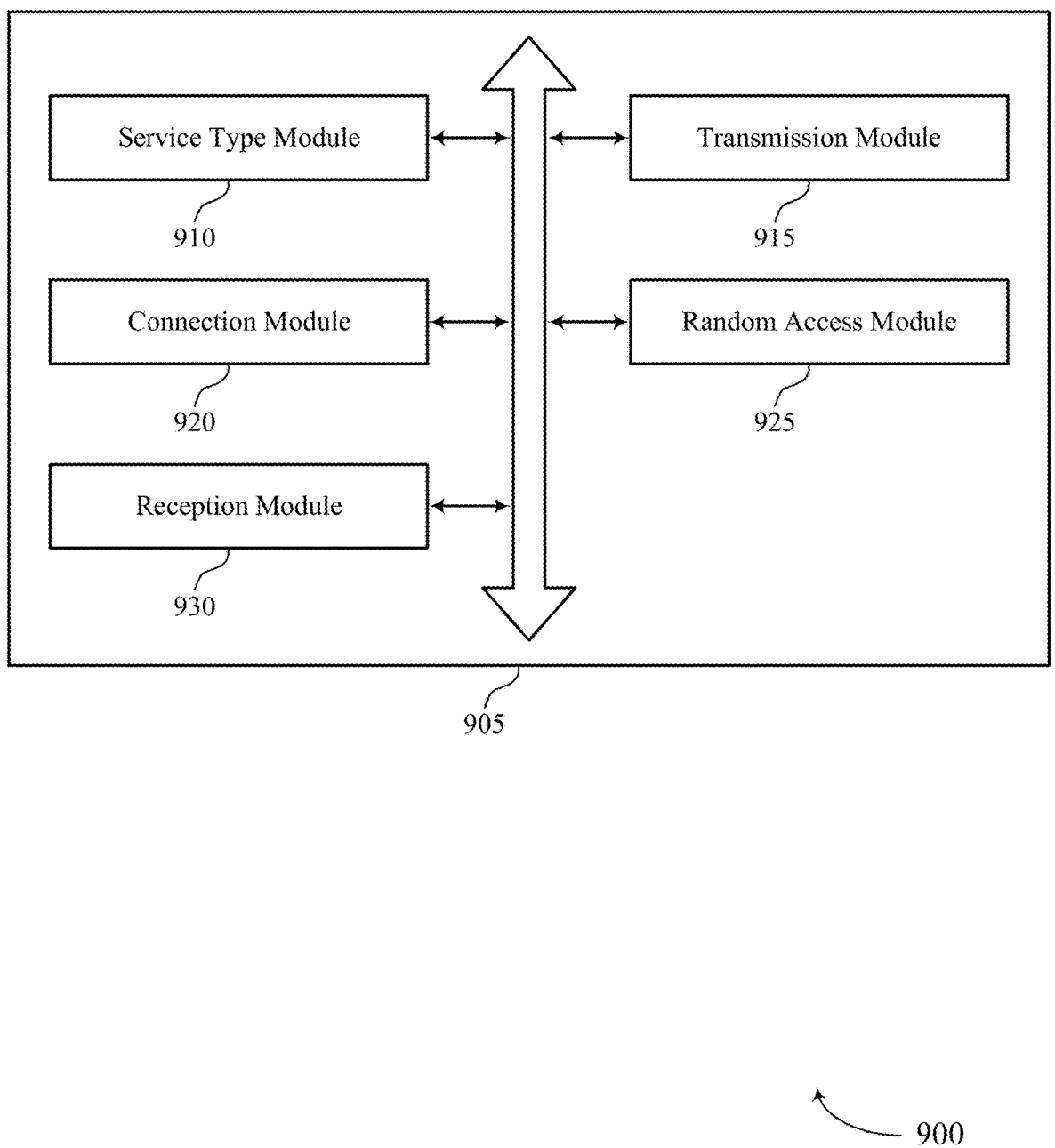
FIG. 9 shows a block diagram of a communications manager that supports unit selection for a node in accordance with aspects of the present disclosure.

FIG. 9 shows a block diagram 900 of a communications manager 905 that supports unit selection for a node in accordance with aspects of the present disclosure. The communications manager 905 may be an example of aspects of a communications manager 715, a communications manager 815, or a communications manager 1010 described herein. The communications manager 905 may include a service type module 910, a transmission module 915, a connection module 920, a random access module 925, and a reception module 930. Each of these modules may communicate, directly or indirectly, with one another (e.g., via one or more buses).

The service type module 910 may determine a service type of the first node, the service type indicating that the first node is a mobile node. The transmission module 915 may transmit, to a second node during a random access procedure, an indication of the service type of the first node. The connection module 920 may establish a connection with a unit of the second node for serving nodes of the wireless network associated with the service type based on transmitting the indication of the service type during the random access procedure. In some cases, the service type indicates a mobility capability of the first node and the connection is an RRC connection. In some cases, the first node includes a relay node, the second node includes a donor node, and the unit includes a central unit of the donor node that is shared between a set of nodes including the second node.

In some examples, transmitting the indication of the service type includes transmitting the indication of the service type in a request to establish the connection with the second node. In some cases, the request includes a Message 3 of the random access procedure or a Message A of the random access procedure.

In some examples, transmitting the indication of the service type includes transmitting the indication of the service type in a confirmation message of the random access procedure. In some cases, the confirmation message includes a Message 5 of the random access procedure. In some examples, transmitting the request includes transmitting a first portion of an identifier for the first node. In some examples, the transmission module 915 may transmit a second portion of the identifier in a Message 5 of the random access procedure.

The random access module 925 may transmit a random access preamble over a set of random access channel resources dedicated to nodes associated with the service type. The reception module 930 may receive from the second node a system information block indicating the set of random access channel resources are dedicated to nodes associated with the service type.

Figure 10:
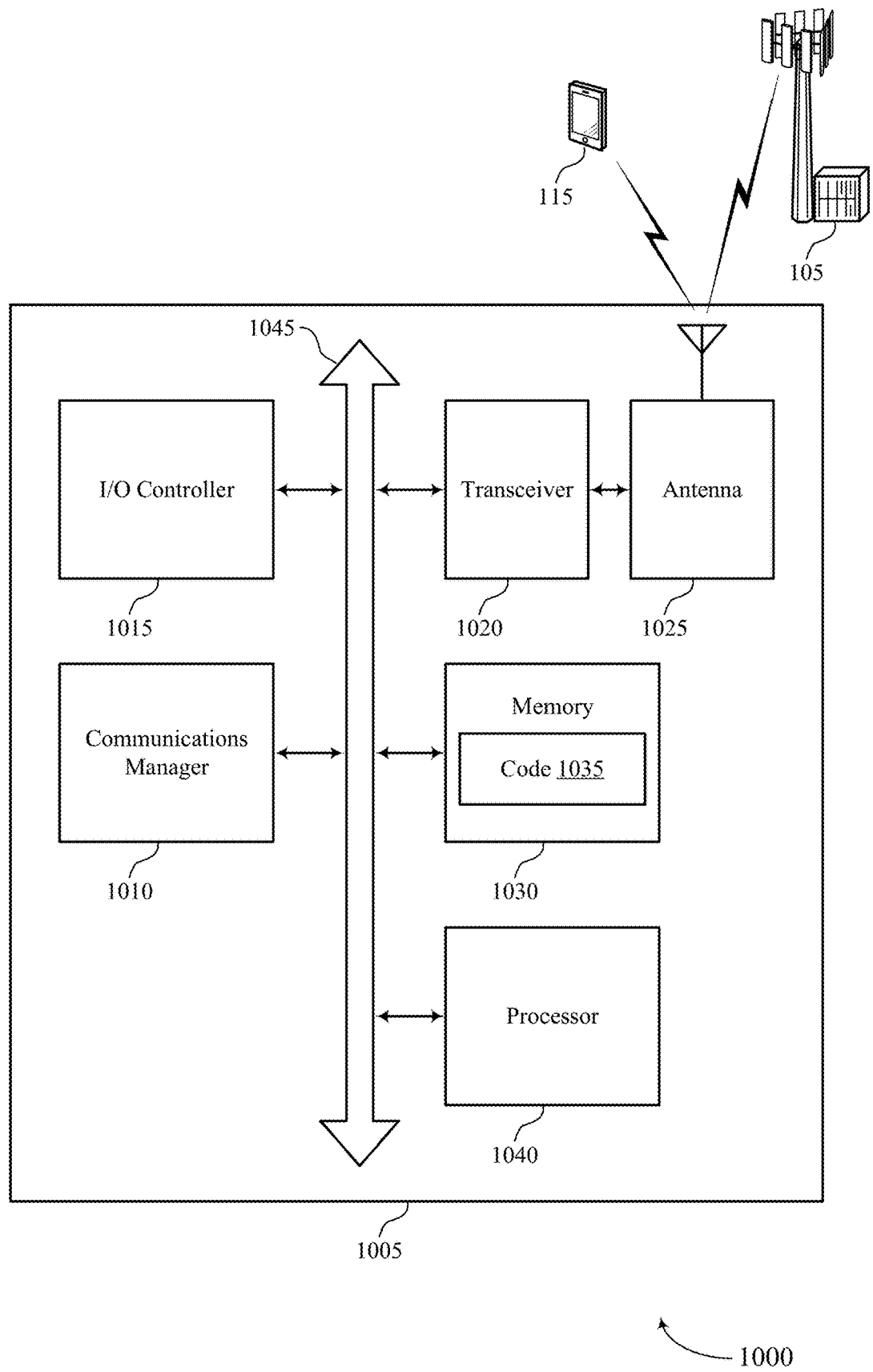
FIG. 10 shows a diagram of a system including a device that supports unit selection for a node in accordance with aspects of the present disclosure.

FIG. 10 shows a diagram of a system 1000 including a device 1005 that supports unit selection for a node in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may determine a service type of the first node, the service type indicating that the first node is a mobile node, transmit, to a second node during a random access procedure, an indication of the service type of the first node, and establish a connection with a unit of the second node for serving nodes of the wireless network associated with the service type based on transmitting the indication of the service type during the random access procedure.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting unit selection for a node).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
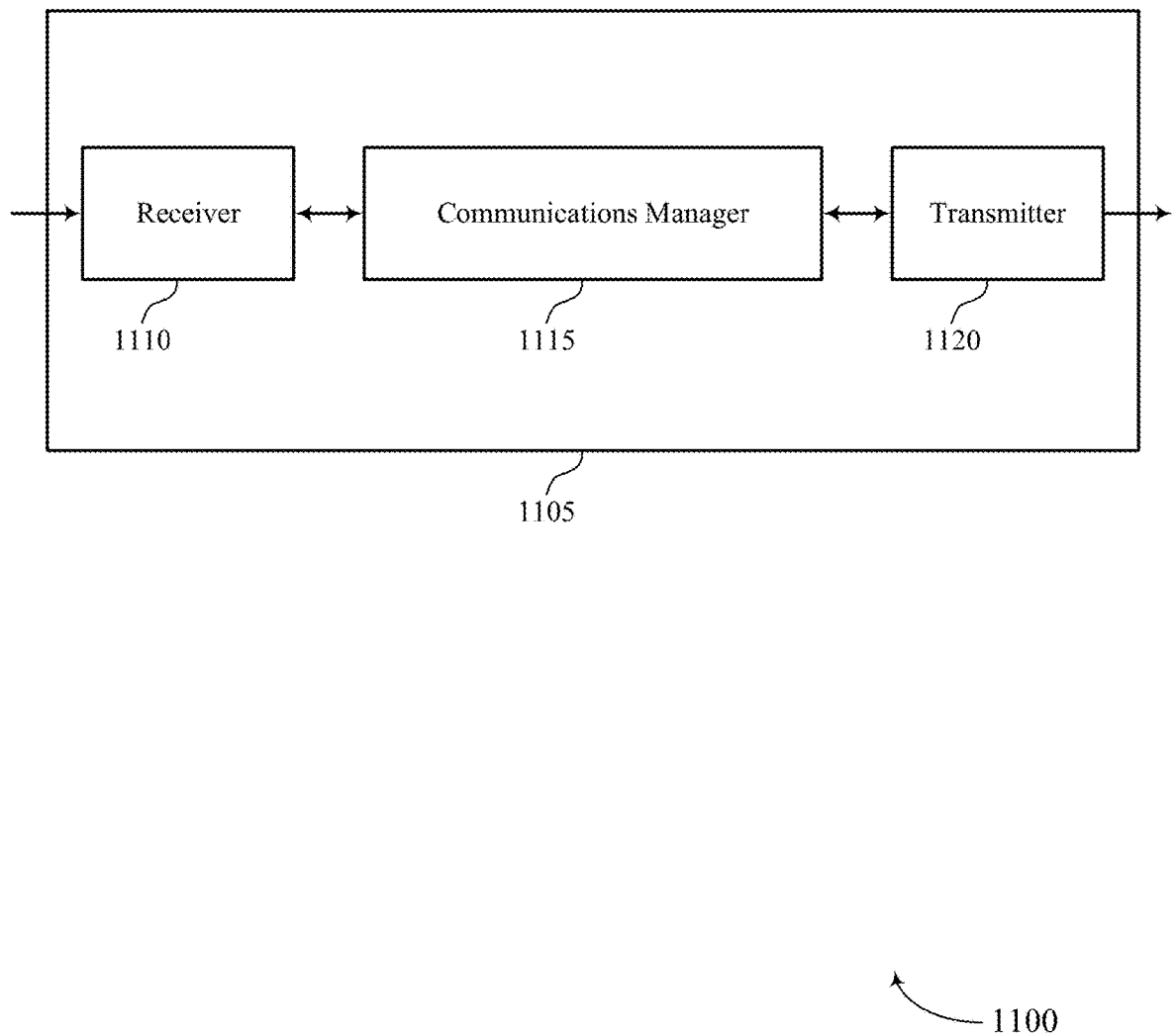
FIGS. 11 and 12 show block diagrams of devices that support unit selection for a node in accordance with aspects of the present disclosure.

FIG. 11 shows a block diagram 1100 of a device 1105 that supports unit selection for a node in accordance with aspects of the present disclosure. The device 1105 may be an example of aspects of a base station 105 as described herein.

The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to unit selection for a node). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may receive an indication of a service type of a second node, the service type indicating that the second node is a mobile node, determine, based on the service type of the second node, a second unit of the first node to establish a connection with the second node, the second unit for serving nodes associated with the service type and being one of a set of units of the first node, and transmit a request to establish the connection to the second unit for serving nodes associated with the service type based on the determination. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
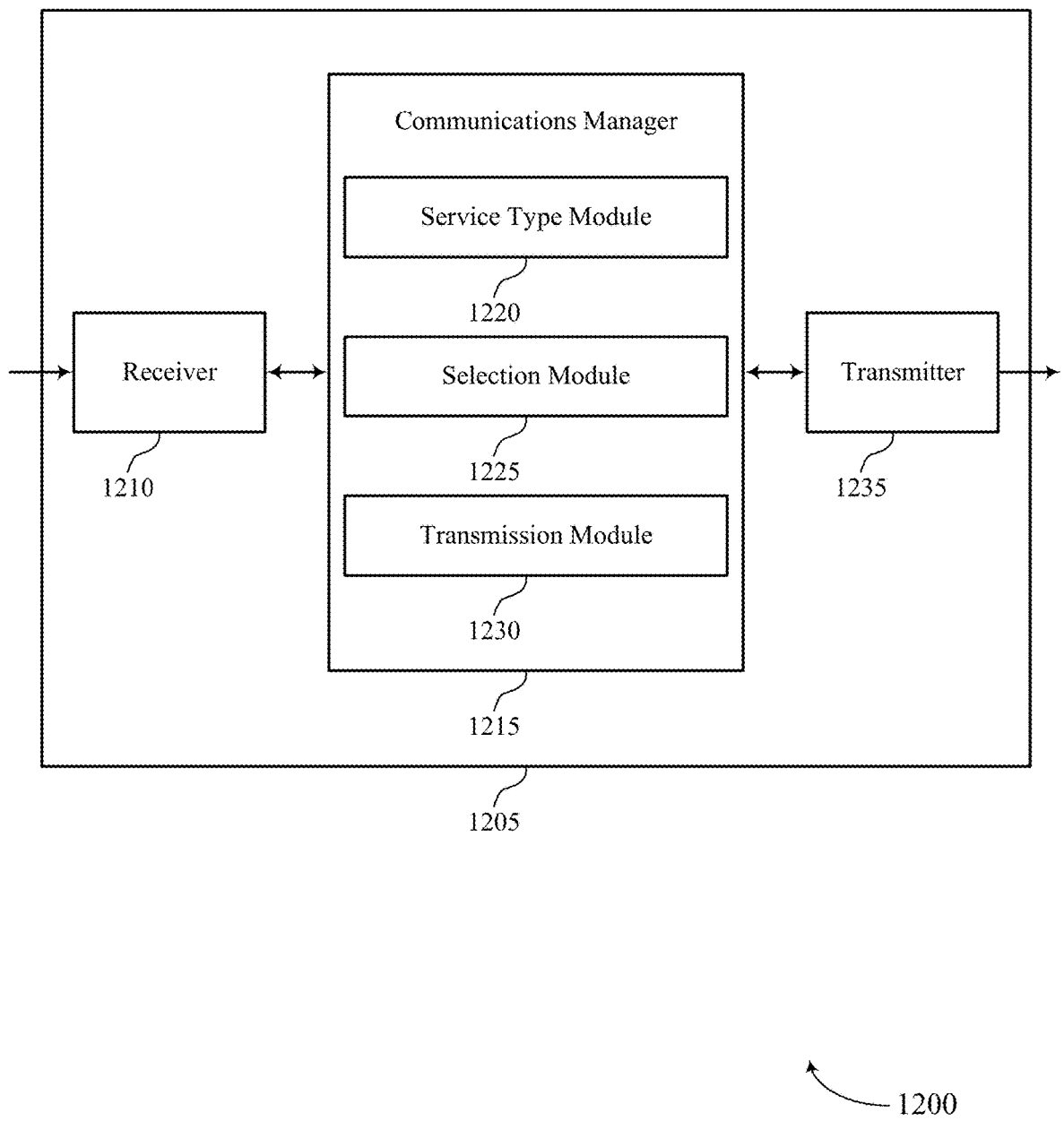

FIG. 12 shows a block diagram 1200 of a device 1205 that supports unit selection for a node in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to unit selection for a node). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a service type module 1220, a selection module 1225, and a transmission module 1230. The communications manager 1215 may be an example of aspects of the communications manager 1410 described herein.

The service type module 1220 may receive an indication of a service type of a second node, the service type indicating that the second node is a mobile node. The selection module 1225 may determine, based on the service type of the second node, a second unit of the first node to establish a connection with the second node, the second unit for serving nodes associated with the service type and being one of a set of units of the first node. The transmission module 1230 may transmit a request to establish the connection to the second unit for serving nodes associated with the service type based on the determination.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
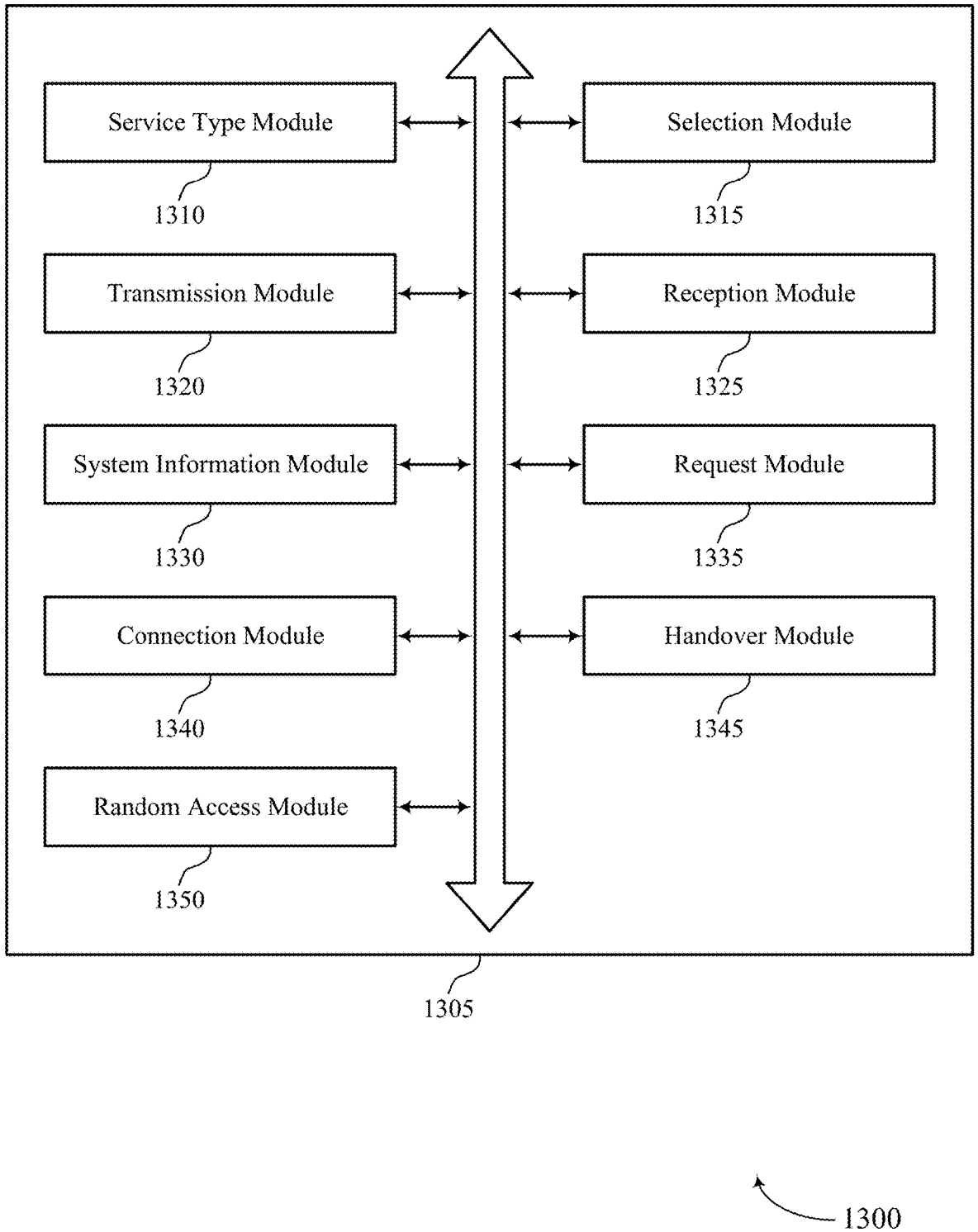
FIG. 13 shows a block diagram of a communications manager that supports unit selection for a node in accordance with aspects of the present disclosure.

FIG. 13 shows a block diagram 1300 of a communications manager 1305 that supports unit selection for a node in accordance with aspects of the present disclosure. The communications manager 1305 may be an example of aspects of a communications manager 1115, a communications manager 1215, or a communications manager 1410 described herein. The communications manager 1305 may include a service type module 1310, a selection module 1315, a transmission module 1320, a reception module 1325, a system information module 1330, a request module 1335, a connection module 1340, a handover module 1345, and a random access module 1350. Each of these modules may communicate, directly or indirectly, with one another (e.g., via one or more buses).

The service type module 1310 may receive an indication of a service type of a second node, the service type indicating that the second node is a mobile node. The selection module 1315 may determine, based on the service type of the second node, a second unit of the first node to establish a connection with the second node, the second unit for serving nodes associated with the service type and being one of a set of units of the first node. The transmission module 1320 may transmit a request to establish the connection to the second unit for serving nodes associated with the service type based on the determination.

The request module 1335 may receive a request from the second node to establish radio resource control connectivity with the first node. In some examples, the selection module 1315 may select, based on the request, the third unit to establish the first connection with the second node. In some cases, the second unit of the first node is located separate from the first unit of the first node and the set of units includes a third unit for serving nodes associated with a second service type that is co-located with the first unit, and where the second unit is shared between a set of nodes including the first node.

In some examples, the transmission module 1320 may transmit the request to the second unit for serving nodes associated with the service type, the request including an indication of the service type of the second node. In some examples, the transmission module 1320 may transmit an indication of the service type of the second node to a core network based on the second node establishing the connection with the second unit for serving nodes associated with the service type.

In some examples, the transmission module 1320 may transmit, to the second unit based on the service type of the second node, the request to establish the second connection. The reception module 1325 may receive the indication of the service type includes receiving the indication of the service type in a request from the second node to establish the connection with the first node. In some examples, the request from the second node includes or indicates a first portion of an identifier for the second node. In some examples, the reception module 1325 may receive a second portion of the identifier in Message 5 of a random access procedure.

In some examples, the reception module 1325 may receive, from the core network, confirmation that the second node has the indicated service type.

In some examples, the reception module 1325 may receive a message from the second node confirming that a first connection has been established with a third unit of the first node that is for serving nodes associated with a second service type, where the message includes the indication of the service type of the second node. In some examples, the transmission module 1320 may transmit, to the third unit for serving nodes associated with the second service type based on the service type of the second node, an instruction to release the first connection with the second node, where the second connection is established based on the instruction to release the first connection.

In some cases, the request from the second node includes a Message 3 of a random access procedure or a Message A of a random access procedure. In some cases, the confirmation message includes a Message 5 of the random access procedure. In some cases, the indication of the service type is received from a core network during a registration procedure with the second node.

The system information module 1330 may receive the indication of the service type includes receiving the indication of the service type in a confirmation message from the second node, the confirmation message part of a random access procedure to establish the connection with the first node.

In some examples, the system information module 1330 may transmit to the second node a system information block indicating the set of random access channel resources dedicated to nodes associated with the service type. The random access module 1350 may receive a random access preamble over a set of random access channel resources dedicated to nodes associated with the service type.

The connection module 1340 may determine that a first connection has been established between the second node and a third unit of the first node that is for serving nodes associated with a second service type. The handover module 1345 may transmit a handover command to the third unit based on the service type of the second node, where the second connection is established based on the handover command.

Figure 14:
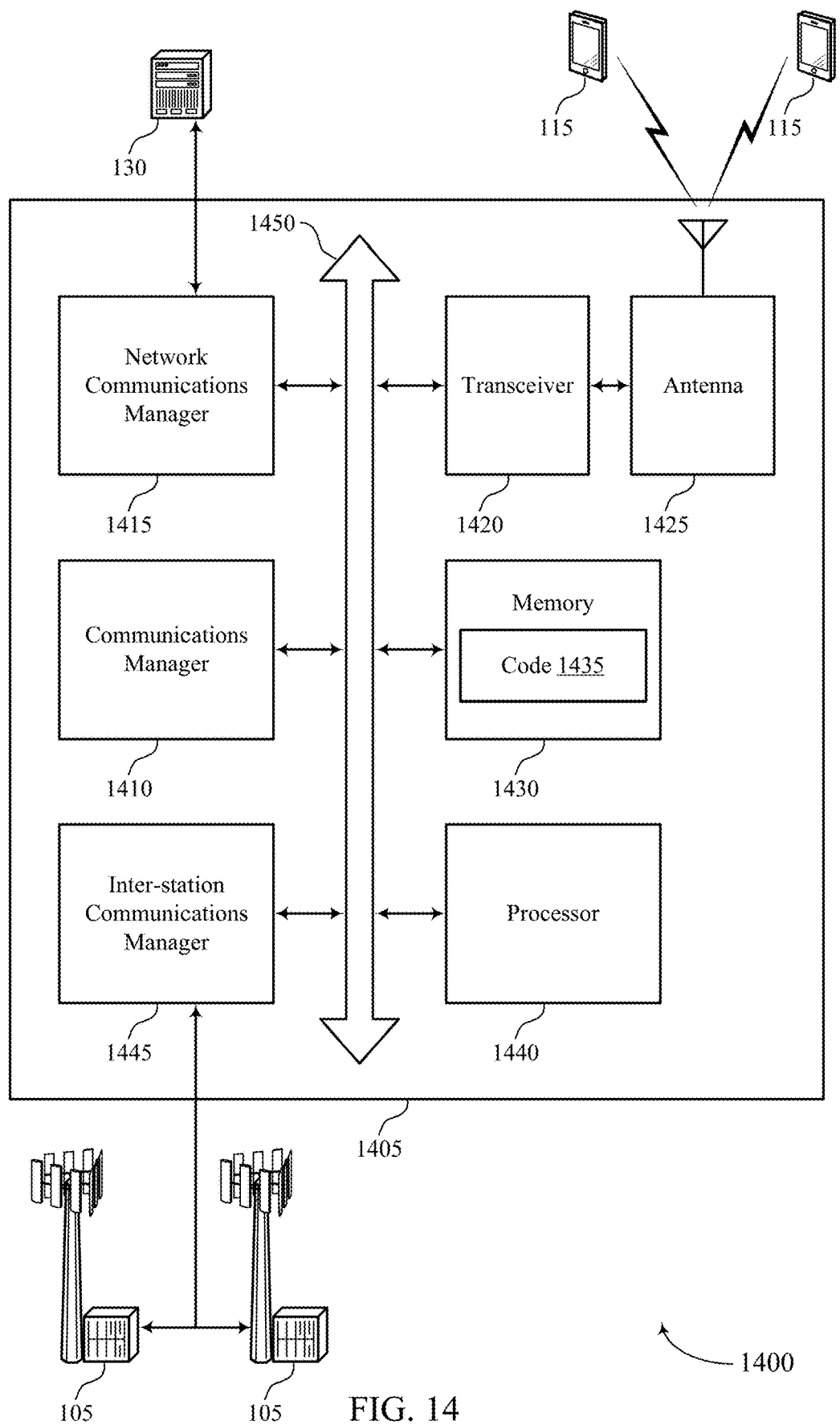
FIG. 14 shows a diagram of a system including a device that supports unit selection for a node in accordance with aspects of the present disclosure.

FIG. 14 shows a diagram of a system 1400 including a device 1405 that supports unit selection for a node in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may receive an indication of a service type of a second node, the service type indicating that the second node is a mobile node, determine, based on the service type of the second node, a second unit of the first node to establish a connection with the second node, the second unit for serving nodes associated with the service type and being one of a set of units of the first node, and transmit a request to establish the connection to the second unit for serving nodes associated with the service type based on the determination.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting unit selection for a node).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
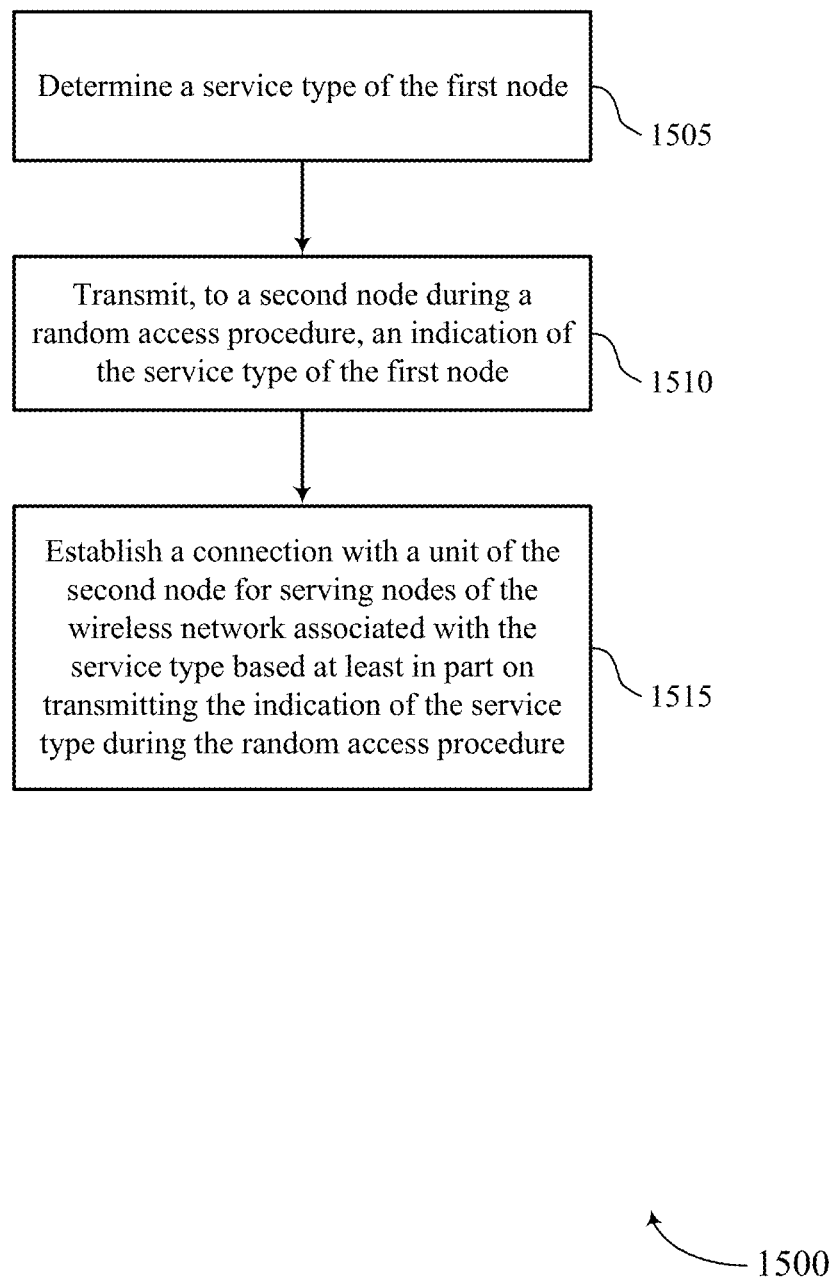
FIGS. 15 and 16 show flowcharts illustrating methods that support unit selection for a node in accordance with aspects of the present disclosure.

FIG. 15 shows a flowchart illustrating a method 1500 that supports unit selection for a node in accordance with aspects of the present disclosure. The operations of method 1500 may be implemented by a node or its components as described herein. For example, the operations of method 1500 may be performed by a communications manager as described with reference to FIGS. 7 through 10. In some examples, a node may execute a set of instructions to control the functional elements of the node to perform the functions described below. Additionally or alternatively, a node may perform aspects of the functions described below using special-purpose hardware.

At 1505, the method may include determining a service type of the first node. In some examples, the service type indicates that the first node is a mobile node. The operations of 1505 may be performed according to the methods described herein. In some examples, aspects of the operations of 1505 may be performed by a service type module as described with reference to FIGS. 7 through 10.

At 1510, the method may include transmitting, to a second node during a random access procedure, an indication of the service type of the first node. The operations of 1510 may be performed according to the methods described herein. In some examples, aspects of the operations of 1510 may be performed by a transmission module as described with reference to FIGS. 7 through 10.

At 1515, the method may include establishing a connection with a unit of the second node for serving nodes of the wireless network associated with the service type based at least in part on transmitting the indication of the service type during the random access procedure. The operations of 1515 may be performed according to the methods described herein. In some examples, aspects of the operations of 1515 may be performed by a connection module as described with reference to FIGS. 7 through 10.

Figure 16:
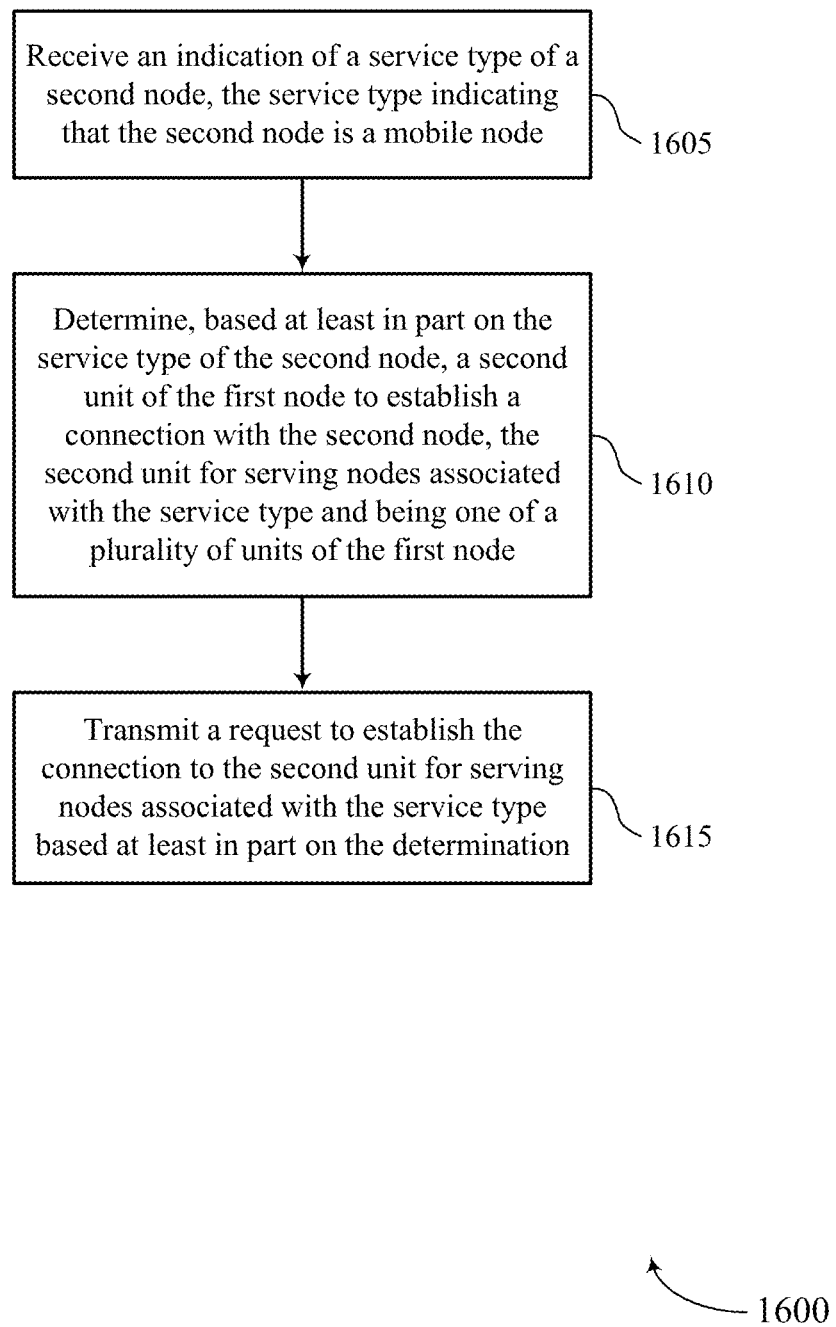

FIG. 16 shows a flowchart illustrating a method 1600 that supports unit selection for a node in accordance with aspects of the present disclosure. The operations of method 1600 may be implemented by a donor node or its components as described herein. For example, the operations of method 1600 may be performed by a communications manager as described with reference to FIGS. 11 through 14. In some examples, a donor node may execute a set of instructions to control the functional elements of the donor node to perform the functions described below. Additionally or alternatively, a donor node may perform aspects of the functions described below using special-purpose hardware.

At 1605, the method may include receiving an indication of a service type of a second node, the service type indicating that the second node is a mobile node. The operations of 1605 may be performed according to the methods described herein. In some examples, aspects of the operations of 1605 may be performed by a service type module as described with reference to FIGS. 11 through 14.

At 1610, the method may include determining, based at least in part on the service type of the second node, a second unit of the first node to establish a connection with the second node, the second unit for serving nodes associated with the service type and being one of a plurality of units of the first node. The operations of 1610 may be performed according to the methods described herein. In some examples, aspects of the operations of 1610 may be performed by a selection module as described with reference to FIGS. 11 through 14.

At 1615, the method may include transmitting a request to establish the connection to the second unit for serving nodes associated with the service type based at least in part on the determination. The operations of 1615 may be performed according to the methods described herein. In some examples, aspects of the operations of 1615 may be performed by a transmission module as described with reference to FIGS. 11 through 14.

It should be noted that the methods described herein describe possible implementations, and that the operations and the features may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example feature that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first node of a wireless network, the method comprising:
   transmitting, to a second node associated with multiple units and during a random access procedure, an indication of a capability supported by the first node, wherein the multiple units comprise a first unit that is specific to nodes that support the capability and a second unit that is specific to nodes that do not support the capability; and
   establishing, based at least in part on transmitting the indication of the capability supported by the first node during the random access procedure, a connection with the first unit, of the multiple units of the second node, that is specific to nodes that support the capability.

2. The method of claim 1, wherein transmitting the indication of the capability comprises:
   transmitting the indication of the capability in a request to establish the connection with the second node.

3. The method of claim 2, wherein the request comprises a Message 3 of the random access procedure or a Message A of the random access procedure.

4. The method of claim 2, wherein transmitting the request comprises transmitting a first portion of an identifier for the first node, the method further comprising:
   transmitting a second portion of the identifier in a Message 5 of the random access procedure.

5. The method of claim 1, wherein transmitting the indication of the capability comprises:
   transmitting the indication of the capability in a confirmation message of the random access procedure.

6. The method of claim 5, wherein the confirmation message comprises a Message 5 of the random access procedure.

7. The method of claim 1, wherein transmitting the indication of the capability comprises:
   transmitting a random access preamble over a set of random access channel resources dedicated to nodes associated with the capability.

8. The method of claim 7, further comprising:
   receiving from the second node a system information block indicating the set of random access channel resources are dedicated to nodes associated with the capability.

9. The method of claim 1, wherein the first node comprises a relay node, the second node comprises a donor node, and the first unit comprises a central unit of the donor node that is shared between a plurality of nodes comprising the second node.

10. The method of claim 1, wherein the capability indicates a mobility capability of the first node and the connection comprises a radio resource control connection.

11. The method of claim 1, wherein the first node comprises a user equipment (UE).

12. An apparatus for wireless communication at a first node of a wireless network, comprising:
a processor,
a memory coupled with the processor, wherein the memory comprises instructions executable by the processor to cause the apparatus to:
transmit, to a second node associated with multiple units and during a random access procedure, an indication of a capability supported by the first node, wherein the multiple units comprise a first unit that is specific to nodes that support the capability and a second unit that is specific to nodes that do not support the capability; and
establish, based at least in part on transmitting the indication of the capability supported by the first node during the random access procedure, a connection with the first unit, of the multiple units of the second node, that is specific to nodes of the wireless network that support the capability.

13. The apparatus of claim 12, wherein the instructions executable by the processor to cause the apparatus to transmit the indication are further executable by the processor to cause the apparatus to:
transmit the indication of the capability in a request to establish the connection with the second node.

* * * * *